(12) United States Patent
Onishi et al.

(10) Patent No.: US 8,064,825 B2
(45) Date of Patent: Nov. 22, 2011

(54) POWER RECEPTION CONTROL DEVICE, POWER TRANSMISSION CONTROL DEVICE, NON-CONTACT POWER TRANSMISSION SYSTEM, POWER RECEPTION DEVICE, POWER TRANSMISSION DEVICE, AND ELECTRONIC INSTRUMENT

(75) Inventors: Kota Onishi, Nagoya (JP); Kentaro Yoda, Chino (JP); Takahiro Kamijo, Fujimi (JP); Mikimoto Jin, Chino (JP); Haruhiko Sogabe, Chino (JP); Yoichiro Kondo, Chino (JP); Kuniharu Suzuki, Tokyo (JP); Hiroshi Kato, Yokohama (JP); Katsuya Suzuki, Takasaki (JP); Manabu Yamazaki, Hiratsuka (JP)

(73) Assignees: Seiko Epson Corporation, Tokyo (JP); Sony Ericsson Mobile, Tokyo (JP)

( * ) Notice: Subject to any disclaimer, the term of this patent is extended or adjusted under 35 U.S.C. 154(b) by 868 days.

(21) Appl. No.: 12/071,150

(22) Filed: Feb. 15, 2008

(65) Prior Publication Data
US 2008/0200119 A1 Aug. 21, 2008

(30) Foreign Application Priority Data
Feb. 16, 2007 (JP) ................................. 2007-036744

(51) Int. Cl.
*H04B 5/00* (2006.01)
(52) U.S. Cl. ...... 455/41.1; 455/13.4; 455/572; 455/522; 455/343.1; 455/127.1; 455/263; 455/292; 375/142; 375/150; 713/300; 713/323; 327/33; 327/545
(58) Field of Classification Search ................. 455/41.1, 455/522, 573, 574, 127.1, 572, 343.1, 292, 455/263, 13.4; 375/142, 130; 713/323, 300; 320/108–109, 114–115, 124, 119, 139
See application file for complete search history.

(56) References Cited

U.S. PATENT DOCUMENTS

| 4,544,924 | A | * | 10/1985 | French ..................... 340/825.69 |
| 5,387,857 | A | * | 2/1995 | Honda et al. ................... 320/120 |
| 5,602,462 | A | * | 2/1997 | Stich et al. ..................... 323/258 |
| 5,650,939 | A | * | 7/1997 | Yoshida ......................... 700/286 |
| 5,654,881 | A | * | 8/1997 | Albrecht et al. ................. 363/25 |
| 5,781,080 | A | * | 7/1998 | Ando ............................ 333/126 |
| 6,097,761 | A | * | 8/2000 | Buhring et al. ............... 375/257 |

(Continued)

FOREIGN PATENT DOCUMENTS

| JP | A-2001-275280 | 10/2001 |
| JP | A-2006-60909 | 3/2006 |
| JP | A-2006-230032 | 8/2006 |

OTHER PUBLICATIONS

U.S. Appl. No. 12/007,671, filed Jan. 14, 2008, Onishi et al.

(Continued)

*Primary Examiner* — Marceau Milord
(74) *Attorney, Agent, or Firm* — Oliff & Berridge PLC

(57) ABSTRACT

A power-receiving-side control circuit of a power reception device performs intermittent load modulation by causing an NMOS transistor to be turned ON/OFF during normal power transmission. A power-transmission-side control circuit included in a power transmission control device of a power transmission device monitors, an intermittent change in the load of the power reception device during normal power transmission. The power-transmission-side control circuit determines that a foreign object has been inserted between a primary coil and a secondary coil and stops power transmission when an intermittent change in load cannot be detected. The amount of power supplied to the load may be compulsorily reduced when the load state of the load is heavy.

19 Claims, 10 Drawing Sheets

U.S. PATENT DOCUMENTS

| | | | | |
|---|---|---|---|---|
| 6,124,700 | A * | 9/2000 | Nagai et al. | 320/132 |
| 7,046,526 | B2 * | 5/2006 | Toda et al. | 363/24 |
| 7,109,682 | B2 * | 9/2006 | Takagi et al. | 320/108 |
| 7,157,889 | B2 * | 1/2007 | Kernahan et al. | 323/268 |
| 7,233,137 | B2 * | 6/2007 | Nakamura et al. | 323/355 |
| 7,274,171 | B2 * | 9/2007 | Nishida et al. | 320/137 |
| 7,281,151 | B2 * | 10/2007 | Miyake et al. | 713/340 |
| 7,365,515 | B2 * | 4/2008 | Takano et al. | 320/116 |
| 7,391,183 | B2 * | 6/2008 | Ariga et al. | 320/125 |
| 7,392,068 | B2 * | 6/2008 | Dayan et al. | 455/572 |
| 7,414,380 | B2 * | 8/2008 | Tang et al. | 320/108 |
| 7,450,910 | B2 * | 11/2008 | Aoki | 455/69 |
| 7,791,311 | B2 * | 9/2010 | Sagoo | 320/108 |

OTHER PUBLICATIONS

U.S. Appl. No. 12/007,672, filed Jan. 14, 2008, Onishi et al.
U.S. Appl. No. 12/071,142, filed Feb. 15, 2008, Onishi et al.
U.S. Appl. No. 12/071,141, filed Feb. 15, 2008, Onishi et al.

* cited by examiner

POWER RECEPTION CONTROL DEVICE, POWER TRANSMISSION CONTROL DEVICE, NON-CONTACT POWER TRANSMISSION SYSTEM, POWER RECEPTION DEVICE, POWER TRANSMISSION DEVICE, AND ELECTRONIC INSTRUMENT

Japanese Patent Application No. 2007-36744 filed on Feb. 16, 2007, is hereby incorporated by reference in its entirety.

BACKGROUND OF THE INVENTION

The present invention relates to a power reception control device, a power transmission control device, a non-contact power transmission system, a power reception device, a power transmission device, an electronic instrument, and the like.

In recent years, non-contact power transmission (contactless power transmission) which utilizes electromagnetic induction to enable power transmission without metal-to-metal contact has attracted attention. As application examples of non-contact power transmission, charging a portable telephone, a household appliance (e.g., telephone handset), and the like has been proposed.

JP-A-2006-60909 discloses a non-contact power transmission device using a primary coil and a secondary coil, for example.

When a non-contact power transmission system successively transmits power in a state in which a metallic foreign object (e.g., thin metal sheet) is inserted between a primary coil (transmission coil) and a secondary coil (receiving coil), a magnetic flux passes through the metallic foreign object so that a short-circuit current (eddy current) flows through the metallic foreign object, whereby the metallic foreign object generates heat and reaches a high temperature (e.g., about 100° C.). The user may be burned when the metallic foreign object reaches a high temperature. Moreover, when the product is partially melted due to heat generated from the metallic foreign object, the product may catch fire.

Since instruments are designed to reduce the space in which a foreign object is inserted by minimizing the space between a power transmission device and a power reception device, the above-mentioned problem generally rarely occurs.

However, a situation may be considered in which a malicious person inserts extremely thin metal foil between a power transmission device and a power reception device, for example. Therefore, measures against insertion of a foreign object are indispensable when putting a non-contact power transmission system into practical use.

As technology relating to measures against insertion of a foreign object, technology has been proposed which provides a dedicated sensor which detects a foreign object (JP-A-2001-275280).

In the technology disclosed in JP-A-2006-60909, a secondary voltage detection section and a secondary current detection section (i.e., dedicated sensor) are provided in a secondary-side instrument (e.g., power-receiving-side portable terminal), and information obtained by the dedicated sensor is transmitted from the secondary-side instrument to a primary-side instrument. The primary-side instrument determines whether or not a primary current (current supplied to primary coil) is an overcurrent using the received information, and controls power supply based on the determination result.

According to the technology disclosed in JP-A-2006-60909, since the dedicated sensor which detects insertion of a foreign object is necessary, the number of parts of the secondary-side instrument increases. Therefore, this technology is disadvantageous from the viewpoint of the mounting area and cost. Moreover, signal processing which detects the secondary voltage and the secondary current and determines whether or not the primary current is an overcurrent is considerably complicated. This imposes load on the primary-side instrument and the secondary-side instrument.

SUMMARY

According to one aspect of the invention, there is provided a power reception control device that is provided in a power reception device that is included in a non-contact power transmission system, the non-contact power transmission system transmitting power from a power transmission device to the power reception device by electromagnetically coupling a primary coil and a secondary coil and transmitting the power to a first load electrically connected to the power reception device, the power reception control device comprising:

a load modulation section that modulates a second load, the second load provided in the power reception device;

a power supply control section that controls power supply to the first load; and a power-reception-side control circuit that is provided in the power reception control device and controls the power reception device, the power-receiving-side control circuit controlling the load modulation section to operate and intermittently change the second load when supplying power to the first load through the power supply control section during normal power transmission.

According to another aspect of the invention, there is provided a power transmission device that is included in a non-contact power transmission system, the non-contact power transmission system transmitting power from the power transmission device to a power reception device by electromagnetically coupling a primary coil and a secondary coil and transmitting the power to a first load electrically connected to the power reception device, the power reception device performing load modulation to intermittently change a second load during normal power transmission, the second load provided in the power reception device, the power transmission control device comprising:

a detection circuit that detects an intermittent change in the second load; and a power-transmission-side control circuit that controls the power transmission device, the power-transmission-side control circuit stopping the normal power transmission when an intermittent change in the second load cannot be detected during the normal power transmission.

According to another aspect of the invention, there is provided a non-contact power transmission system that transmits power from a power transmission device to a power reception device by electromagnetically coupling a primary coil and a secondary coil and transmits the power to a first load electrically connected to the power reception device, the system comprising:

the power transmission control device including:

a detection circuit that detects a change of a second load, the second load provided in the power reception device; and a power-transmission-side control circuit that controls the power transmission device;

the power reception device including:

a load modulation section that modulates the second load;

a power supply control section that controls power supply to the first load: and a power reception control device that includes a power-receiving-side control circuit that controls the power reception device;

the power-receiving-side control circuit controlling the load modulation section to operate and intermittently change the second load when supplying power to the first load through the power supply control section during normal power transmission, the power-receiving-side control circuit apparently reducing a load state of the first load by compulsorily reducing the power supplied to the first load by controlling the power supply control section when the first load is heavy in a period of the second load is intermittently changed, and performing only an operation of intermittently changing the second load without reducing the load state of the first load by controlling the power supply control section when the first load is light; and the power-transmission-side control circuit determining that a foreign object has been inserted between the primary coil and the secondary coil, and stopping the normal power transmission when an intermittent change in the second load cannot be detected during the normal power transmission.

According to another aspect of the invention, there is provided a power reception device comprising:

the above power reception control device; and a power reception section that converts an induced voltage in a secondary coil into a direct voltage.

According to another aspect of the invention, there is provided a power transmission device comprising:

the above power transmission control device; and a power transmission section that generates an alternating voltage and supplies the alternating voltage to the primary coil.

According to another aspect of the invention, there is provided an electronic instrument comprising:

the above power reception device; and a load of the power reception device, power being supplied to the load from the power reception device.

According to another aspect of the invention, there is provided an electronic instrument comprising the above power transmission device.

BRIEF DESCRIPTION OF THE SEVERAL VIEWS OF THE DRAWING

FIG. 1A is an oblique view showing a state in which a portable telephone as a power reception device is placed on a charger (cradle) as a power transmission device, and FIG. 1B is a cross-sectional view showing the main portion of electronic instruments which is illustrative of the principle of power transmission from a power transmission device to a power reception device.

FIG. 4A is a view showing a normal power transmission state, and FIG. 4B is a view showing a state in which a foreign object is inserted.

FIG. 5A is a view showing a change in the load of the power reception side with respect to the power transmission device while normally charging a secondary battery of a portable telephone terminal shown in FIG. 4, and FIG. 5B is a view showing the case where an abnormal change in the load of the power reception device with respect to the power transmission device has occurred during charging.

FIG. 8A is a view showing a timing example of load modulation, and FIG. 8B is a view showing a change in load of a power reception side detected by a power transmission device in detail.

FIG. 9A is a view showing a state in which the load is light, FIG. 9B is a view showing a state in which the load is heavy, FIG. 9C is a view showing a change in primary coil voltage in the state shown in FIG. 9B, FIG. 9D is a view showing a state in which the load is reduced by turning a power supply control transistor ON/OFF or setting the power supply control transistor in a half ON state, and FIG. 9E is a view showing a change in primary coil voltage in the state shown in FIG. 9D.

DETAILED DESCRIPTION OF THE EMBODIMENT

Figure 1A:
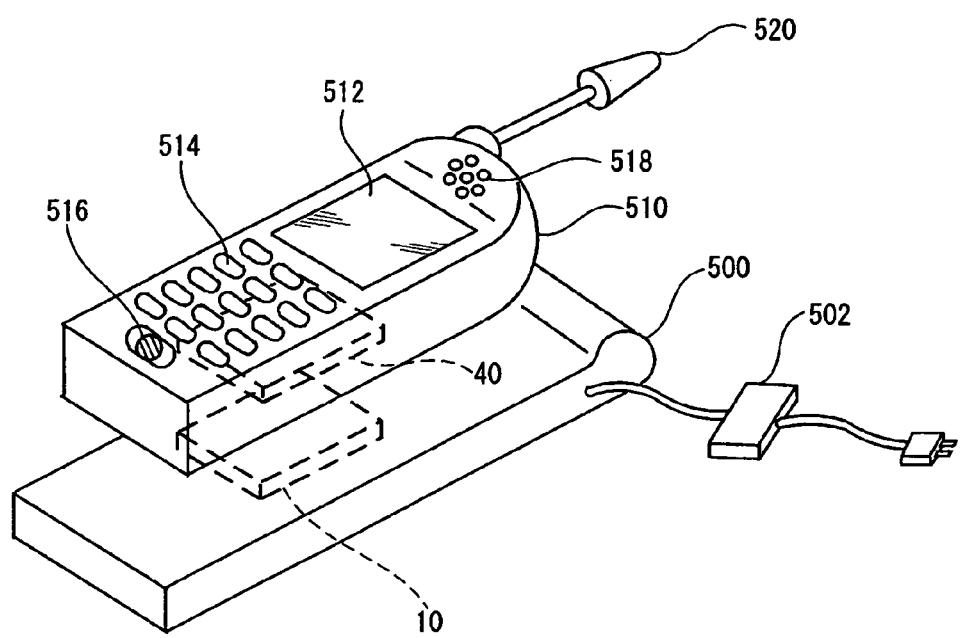
FIGS. 1A and 1B are views showing examples of an electronic instrument utilizing non-contact power transmission.

Some aspects of the invention enable insertion of a foreign object between a primary coil and a secondary coil to be accurately detected by simple signal processing while reducing the number of parts to implement highly reliable safety measures relating to non-contact power transmission.

(1) According to one embodiment of the invention, there is provided a power reception control device that is provided in a power reception device that is included in a non-contact power transmission system, the non-contact power transmission system transmitting power from a power transmission device to the power reception device by electromagnetically coupling a primary coil and a secondary coil and transmitting the power to a first load electrically connected to the power reception device, the power reception control device comprising:

a load modulation section that modulates a second load, the second load provided in the power reception device;

a power supply control section that controls power supply to the first load; and a power-reception-side control circuit that is provided in the power reception control device and controls the power reception device, the power-receiving-side control circuit controlling the load modulation section to operate and intermittently change the second load when supplying power to the first load through the power supply control section during normal power transmission.

The power reception device (device which receives power) includes the load modulation section, and transmits information to the power transmission device by changing the load of the power reception side with respect to the power transmission device. The load of the power reception side with respect to the power transmission device (the power-reception-side load) may be determined by operation state of the power reception device. For example, the power reception device can notify the power transmission device that the power reception device is an appropriate instrument that can receive power from the power transmission device by transmitting data "1" and data "0" by changing the degree of load in an authentication stage before commencement of normal power transmission. The power-receiving-side control circuit included in the power reception control device causes the load modulation section to intermittently change the load of the power reception side when authentication has completed and normal power transmission (successive power transmission) is performed (e.g., when charging current is supplied to a battery pack (i.e., load)). Power is supplied to the load of the power reception device (i.e., a battery pack) even when load modulation is performed. Since the power reception device intermittently changes the load of the power reception side with respect to the power transmission device at a given timing (i.e., timing known to the power transmission device), the power transmission device can always detect an intermittent change in the load of the power reception side during normal power transmission unless a foreign object is inserted. Therefore, the power transmission device can determine that a foreign object has been inserted when the power transmission device cannot detect an intermittent change in the load of the power reception side with respect to the power transmission device According to the invention, since the load of the power reception side with respect to the power transmission device (the power-reception-side load) is intermittently changed by load modulation and a signal useful for foreign object detection is transmitted from the power reception device to the power transmission device during normal power transmission, the power transmission device can determine whether or not a foreign object has been inserted based on whether or not the power transmission device can receive the above signal. The load modulation section included in the power reception device is provided to transmit information to the power transmission device. Since the load modulation section is utilized to detect a foreign object, dedicated hardware need not be provided to detect a foreign object. Since the load modulation method is employed as a communication means from the power reception device, the power transmission device necessarily has a configuration which detects a change in load. The power transmission device can determine whether or not a foreign object has been inserted by merely operating the configuration which detects a change in load of the power reception side with respect to the power transmission device during normal power transmission. Therefore, it is unnecessary to provide additional hardware in the power transmission device. A change in the load of the power reception side can be relatively easily detected by detecting the waveform of the induced voltage in the primary coil, for example (note that the detection method is not limited thereto). A change in the load of the power reception side with respect to the power transmission device can be accurately detected by general digital signal processing. Since the signal due to load modulation is transmitted from the power reception device to the power transmission device utilizing the same path as the path used for normal power transmission (i.e., the path through the primary coil and the secondary coil), a dedicated transmission path for the signal which enables detection of insertion of a foreign object need not be provided. Therefore, it is possible to accurately detect insertion of a foreign object between the primary coil and the secondary coil by simple signal processing while reducing the number of parts by forming a non-contact power transmission system using the power reception control device according to the invention.

(2) In the power reception control device according to this embodiment, the power-reception-side control circuit may change the second load periodically by controlling an operation of the load modulation section, the second load being intermittently changed at plural times, the plural times determined at given intervals in a period.

The above statement defines that the load of the power reception side with respect to the power transmission device is intermittently changed cyclically (i.e., in cycle units (in units of one cycle)) during normal power transmission, and the load is intermittently changed a plurality of times at given intervals within one cycle. The power transmission device and the power reception device can transfer the information relating to a change in load in synchronization by cyclically changing the load. Moreover, the power transmission device can easily determine whether a change in load of the power reception side with respect to the power transmission device is noise or a normal signal when detecting a change in load of the power reception side with respect to the power transmission device by intermittently changing the load a plurality of times at given intervals within one cycle, whereby the foreign object detection accuracy can be increased.

(3) In the power reception control device according to this embodiment, the power-reception-side control circuit may intermittently change the second load only in a partial time in the period.

Since a change in load of the power reception side with respect to the power transmission device (load modulation) during normal power transmission may affect power supply to the load of the power reception device (i.e., battery pack), it is undesirable to frequently change the load to a large extent. Therefore, one cycle of load modulation is increased to some extent (foreign object can be detected even if the cycle of load modulation is increased to some extent). The load is intermittently changed a plurality of times at given intervals only in a given period within one cycle. Specifically, when the load change interval is increased to a large extent, the power transmission device may not appropriately detect an intermittent change in the load of the power reception device due to a change in the load state of the load with the passage of time or a change in surrounding conditions. Therefore, one cycle is increased and the load is intermittently modulated a plurality of times only in a short period within one cycle, for example. This enables the power transmission device to detect a foreign object with high accuracy while minimizing an effect on power supply to the load (e.g., charging a battery pack).

(4) In the power reception control device according to this embodiment, the power-reception-side control circuit may monitor a load state of the first load, and may compulsorily reduce the power supplied to the first load by controlling the power supply control section when the first load is heavy in a period during the second load is intermittently changed.

According to this embodiment, since load modulation is performed without stopping power supply to the load during normal power transmission, transmission of the signal due to load modulation to the power transmission device is always affected by the state of power supply to the load of the power reception device (i.e., the load state of the battery pack). For example, even if a small current is turned ON/OFF for load modulation when a large amount of charging current is supplied to the load of the power reception device (e.g., battery pack), since the amount of ON/OFF current is smaller than the amount of charging current supplied to the load of the power reception device (i.e., battery pack), it is difficult for the power transmission device to detect a change in load of the power reception side with respect to the power transmission device due to load modulation (i.e., it is difficult for the power transmission device to detect whether a change in load is noise or a signal due to load modulation). On the other hand, the relative ratio of the ON/OFF current due to load modulation increases when the amount of current supplied to the load of the power reception device (e.g., battery pack) is small (when the load state of the load of the power reception device (e.g., battery pack) is light), so that the power transmission device can easily detect a change in load of the power reception side with respect to the power transmission device due to the ON/OFF operation. According to this aspect, the power reception device monitors the load state of the load of the power reception device (e.g., battery pack) during normal power transmission, and, when the load is heavy (i.e., a large amount of current is supplied to the load of the power reception device (e.g., battery pack)) when the power reception device performs load modulation which enables detection of a foreign object, the amount of power supplied to the load is compulsorily reduced based on the above consideration (the amount of power supply is merely reduced without stopping power supply to the load so that at least a minimum amount of power is supplied to the load of the power reception device (e.g., battery pack)). Since the load state of the load of the power reception device is apparently reduced by reducing the amount of power supplied to the load, the power transmission device can easily detect the signal due to load modulation. Therefore, the foreign object detection accuracy is maintained at a desired level even when the load state of the load of the power reception device (e.g., battery pack) is heavy. Since at least a minimum amount of power is always supplied to the load even when compulsorily reducing the load of the power reception device (e.g., battery pack), a problem in which the electronic circuit of the load cannot operate does not occur. Moreover, since load modulation which enables detection of insertion of a foreign object is intermittently performed at appropriate intervals taking the effect on power supplied to the load of the power reception device (e.g., battery pack) into consideration, as stated above, power supplied to the load of the power reception device (e.g., battery pack) is not adversely affected even if the load is compulsorily reduced (for example, a problem in which the charging time of the battery pack increases to a large extent does not occur). The load change detection accuracy of the power transmission device side can be maintained at a desired level even when the load of the power reception device (e.g., battery pack) is heavy by causing the power reception device to monitor the state of the load and optionally reduce the load of the power reception device when performing load modulation which enables detection of insertion of a foreign object. Note that the load reduction process may be uniformly performed during load modulation without monitoring the load state of the load. In this case, load imposed on the power reception control device is reduced to such an extent that the load state of the load of the power reception device (e.g., battery pack) is not monitored.

(5) In the power reception control device according to this embodiment, the power supply control section may include a power supply control transistor that is provided in a power supply path connected to the first load; and the power-reception-side control circuit may compulsorily reduce the power supplied to the first load by successively switching the power supply control transistor.

The above statement defines an example of a specific method of compulsorily reducing the amount of power supplied to the load of the power reception device (e.g., battery pack). According to this embodiment, the amount of power supplied to the load of the power reception device (e.g., battery pack) is compulsorily reduced using a digital method which causes the power supply control transistor provided in the power supply path to be successively turned ON/OFF. The operation of successively switching a transistor is generally employed for a digital circuit and is easily implemented. Moreover, it is possible to accurately reduce the amount of power supplied to the load of the power reception device (e.g., battery pack) by selecting the switching frequency.

(6) In the power reception control device according to this embodiment, the power supply control section may include a field effect transistor as a power supply control transistor that is provided in a power supply path connected to the first load; and the power-receiving-side control circuit may compulsorily reduce the power supplied to the first load by reducing an output current of the field effect transistor by setting a gate voltage of the field effect transistor at an intermediate voltage between a gate voltage when the field effect transistor is completely turned ON and a gate voltage when the field effect transistor is completely turned OFF.

The above statement defines another example of a specific method of compulsorily reducing the amount of power supplied to the load of the power reception device (e.g., battery pack). According to this embodiment, the amount of power supplied to the load is reduced using an analog method in which an intermediate voltage between a complete ON voltage and a complete OFF voltage is supplied to the gate of the field effect transistor (e.g., MOS transistor) to set the field effect transistor in a half ON state. This method has an advantage in that the on-resistance of the field effect transistor can be finely adjusted by controlling the gate voltage.

(7) In the power reception control device according to this embodiment, the power supply control section may include a series regulator that stabilizes a voltage supplied to the first load; and the power-receiving-side control circuit may monitor the load state of the first load by detecting a voltage between terminals of the series regulator.

The above statement defines an example of a method of monitoring the state of the load of the power reception device (e.g., battery pack). The operation of reducing the load of the power reception device (e.g., battery pack) is performed during load modulation which enables detection of insertion of a foreign object only when the load of the power reception device (e.g., battery pack) is heavy. Therefore, the power reception device must monitor the state of the load in order to appropriately perform the load reducing operation. The state of the load of the power reception device (e.g., battery pack) may be monitored regularly or intermittently. On the other hand, it is necessary to accurately monitor the load state using a simple configuration. According to this embodiment, the voltage across the series regulator which functions as a constant voltage circuit (power supply circuit) is monitored to detect the state of the load. The series regulator is a voltage-drop-type and continuous-current-type power supply circuit. The voltage at the output terminal of the series regulator is constant, but the potential at the input terminal of the series regulator changes depending on the voltage at the end of the primary coil. Since the voltage at the end of the primary coil changes depending on the load state of the load of the power reception device (e.g., battery pack), the state of the load can be detected by monitoring the voltage across the series regulator. It is necessary to monitor the voltage at the input terminal of the series regulator in order to detect the frequency, for example. On the other hand, the voltage at the output terminal of the series regulator is used as the power supply voltage of the power-receiving-side control circuit, for example. Therefore, a special circuit is unnecessary in order to detect the voltages at the input terminal and the output terminal of the series regulator so that this method can be very easily implemented.

(8) In the power reception control device according to this embodiment, the power supply control section may include a power supply control transistor that is provided in a power supply path connected to the first load; and the power-receiving-side control circuit may monitor the load state of the first load by detecting a voltage between terminals of the power supply control transistor.

According to this embodiment, the load state of the load of the power reception device (e.g., battery pack) is monitored by monitoring the voltage across the power supply control transistor. Since the voltage across the power supply control transistor changes depending on the amount of current supplied to the load of the power reception device (e.g., battery pack), the state of the load can be detected by monitoring the voltage across the power supply control transistor.

(9) In the power reception control device according to this embodiment, the power-receiving-side control circuit may monitor the load state of the first load by detecting a current that flows through a power supply path of the power supply control section.

According to this embodiment, the load state of the load of the power reception device (e.g., battery pack) is monitored by directly monitoring the amount of current which flows through the power supply path. Since the amount of current supplied to the load of the power reception device (e.g., battery pack) is small when the load is light and increases when the load increases, the state of the load of the power reception device (e.g., battery pack) can be detected by directly monitoring the amount of current which flows through the power supply path. This embodiment has an advantage in that the state of the load can be accurately monitored.

(10) According to another embodiment of the invention, there is provided a power transmission control device that is provided in a power transmission device that is included in a non-contact power transmission system, the non-contact power transmission system transmitting power from the power transmission device to a power reception device by electromagnetically coupling a primary coil and a secondary coil and transmitting the power to a first load electrically connected to the power reception device, the power reception device performing load modulation to intermittently change a second load during normal power transmission, the second load provided in the power reception device, the power transmission control device comprising:

a detection circuit that detects an intermittent change in the second load; and a power-transmission-side control circuit that controls the power transmission device, the power-transmission-side control circuit stopping the normal power transmission when an intermittent change in the second load cannot be detected during the normal power transmission.

The power-transmission-side control circuit included in the power transmission control device determines that a foreign object has been inserted between a primary coil and a secondary coil and stops power transmission when an intermittent change in the load of the power reception side with respect to the power transmission device (the power-reception-side load) cannot be detected. This reliably prevents heat generation from a foreign object, a skin burn, and damage to and destruction of the instrument. Therefore, highly reliable foreign object insertion measures are implemented in a non-contact power transmission system.

(11) In the power transmission control device according to this embodiment, the second load during the normal power transmission may be cyclically changed, and the power-transmission-side control circuit may detect changes in the second load in cycle units, and the power-transmission-side control circuit may stop the normal power transmission when the power-transmission-side control circuit cannot detect a change of the second load in a given number of cycles.

In order to carefully determine whether or not a foreign object has been inserted, the power-transmission-side control circuit detects a change in the load of the power reception side with respect to the power transmission device in cycle units, and stops normal power transmission when the power-transmission-side control circuit cannot detect a change in load of the power reception side with respect to the power transmission device over a given number of cycles (e.g., three cycles). This increases the foreign object insertion detection accuracy, thereby preventing a situation in which the power-transmission-side control circuit erroneously stops normal power transmission when a change in load cannot be detected due to an accidental factor.

(12) In the power transmission control device according to this embodiment, the detection circuit may be a waveform detection circuit that detects a waveform of an induced voltage in the primary coil.

The above statement defines that the waveform of the induced voltage in the primary coil is detected in order to detect a change in the load of the power reception side with respect to the power transmission device. For example, since the peak value (amplitude) of the waveform of the induced voltage in the primary coil increases when the load of the power reception device (e.g., battery pack) is heavy and decreases when the load of the power reception device (e.g., battery pack) is light, a change in the load of the power reception side with respect to the power transmission device can be detected by detecting the peak of the waveform. Note that the detection method is not limited thereto. For example, the phase of the induced voltage or current in the primary coil may be detected.

(13) According to another embodiment of the invention, there is provided a non-contact power transmission system that transmits power from a power transmission device to a power reception device by electromagnetically coupling a primary coil and a secondary coil and transmits the power to a first load electrically connected to the power reception device, the system comprising:

the power transmission control device including:

a detection circuit that detects a change of a second load, the second load provided in the power reception device; and a power-transmission-side control circuit that controls the power transmission device;

the power reception device including:

a load modulation section that modulates the second load;

a power supply control section that controls power supply to the first load: and a power reception control device that includes a power-receiving-side control circuit that controls the power reception device;

the power-receiving-side control circuit controlling the load modulation section to operate and intermittently change the second load when supplying power to the first load through the power supply control section during normal power transmission, the power-receiving-side control circuit apparently reducing a load state of the first load by compulsorily reducing the power supplied to the first load by controlling the power supply control section when the first load is heavy in a period of the second load is intermittently changed, and performing only an operation of intermittently changing the second load without reducing the load state of the first load by controlling the power supply control section when the first load is light; and the power-transmission-side control circuit determining that a foreign object has been inserted between the primary coil and the secondary coil, and stopping the normal power transmission when an intermittent change in the second load cannot be detected during the normal power transmission.

The power reception device performs intermittent load modulation during normal power transmission. When the load of the power reception device (e.g., battery pack) is heavy, the amount of power supplied to the load of the power reception device (e.g., battery pack) is compulsorily reduced to apparently reduce the load. The power transmission device monitors the load of the power reception side with respect to the power transmission device of the power reception device during normal power transmission, and determines that a foreign object has been inserted and stops power transmission when an intermittent change in the load of the power reception side with respect to the power transmission device cannot be detected. This enables insertion of a foreign object to be accurately detected by simple signal processing without adding a special configuration. Therefore, a reliable, small, and inexpensive non-contact power transmission system can be implemented which is provided with reliable measures against insertion of a foreign object.

(14) According to another embodiment of the invention, there is provided a power reception device comprising:

the above power reception control device; and a power reception section that converts an induced voltage in a secondary coil into a direct voltage.

A novel power reception device is thus implemented which has a function of transmitting a signal which enables detection of insertion of a foreign object during normal power transmission to the power transmission device.

(15) According to another embodiment of the invention, there is provided a power transmission device comprising:

the above power transmission control device; and a power transmission section that generates an alternating voltage and supplies the alternating voltage to the primary coil.

A novel power transmission device is thus implemented which has a function of receiving a signal due to load modulation by the power reception device during normal power transmission and detecting insertion of a foreign object depending on whether or not the signal can be received.

(16) According to another embodiment of the invention, there is provided an electronic instrument comprising:

the above power reception device; and a load of the power reception device, power being supplied to the load from the power reception device.

Since it is possible to deal with insertion of a foreign object when supplying power to the load, the safety of an electronic instrument such as a portable terminal which can perform non-contact power transmission can be increased. Therefore, the user can use the electronic instrument without worry.

(17) According to another embodiment of the invention, there is provided an electronic instrument comprising the above power transmission device.

Since it is possible to deal with insertion of a foreign object when supplying power to the load, the safety of an electronic instrument such as a charger (e.g., cradle) which can perform non-contact power transmission can be increased. Therefore, the user can use the electronic instrument without worry.

As described above, some embodiments of the invention enable insertion of a foreign object between the primary coil and the secondary coil to be accurately detected by simple signal processing while reducing the number of parts, for example. Moreover, highly reliable safety measures relating to non-contact power transmission can be implemented.

Preferred embodiments of the invention are described below with reference to the drawings.

Note that the embodiments described below do not in any way limit the scope of the invention defined by the claims laid out herein. Note that all elements of the embodiments described below should not necessarily be taken as essential requirements for the invention.

First Embodiment

Examples of an electronic instrument to which the invention is suitably applied and the principle of non-contact power transmission technology are described below.

Figure 1B:
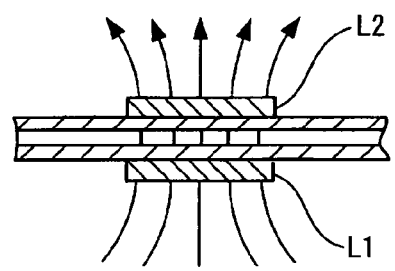

Examples of electronic instrument and principle of non-contact power transmission FIGS. 1A and 1B are views illustrative of non-contact power transmission technology. FIG. 1A is a view showing examples of an electronic instrument to which non-contact power transmission is applied. FIG. 1B is a view illustrative of the principle of non-contact power transmission using an induction transformer.

As shown in FIG. 1A, a charger 500 (cradle) (i.e., electronic instrument) includes a power transmission device 10. A portable telephone 510 (i.e., electronic instrument) includes a power reception device 40. The portable telephone 510 also includes a display section 512 such as an LCD, an operation section 514 which includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

The electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

Examples of a particularly suitable electronic instrument include a portable terminal (including portable telephone terminal, PDA terminal, and portable personal computer terminal) and a watch. Since the power reception device according to the invention has a simple configuration and is small, the power reception device can be provided in a portable terminal and the like. The charging time of a secondary battery provided in an electronic instrument or the like can be reduced using the power reception device according to the invention due to low loss. Moreover, since heat generation is reduced using the power reception device according to the invention, the reliability of an electronic instrument increases from the viewpoint of safety.

In particular, since a large amount of charging current flows through a portable terminal (including portable telephone terminal, PDA terminal, and portable personal computer terminal) under heavy load, heat generation tends to occur. Therefore, the features of the invention (i.e., low loss and low heat generation) can be sufficiently utilized for such a portable terminal.

As schematically shown in FIG. 1B, power transmission from the power transmission device 10 to the power reception device 40 is implemented by electromagnetically coupling a primary coil L1 (transmitting coil) provided in the power transmission device 10 and a secondary coil L2 (receiving coil) provided in the power reception device 40 to form a power transmission transformer. This enables non-contact power transmission.

Configuration example of power transmission device and power reception device

Figure 2:
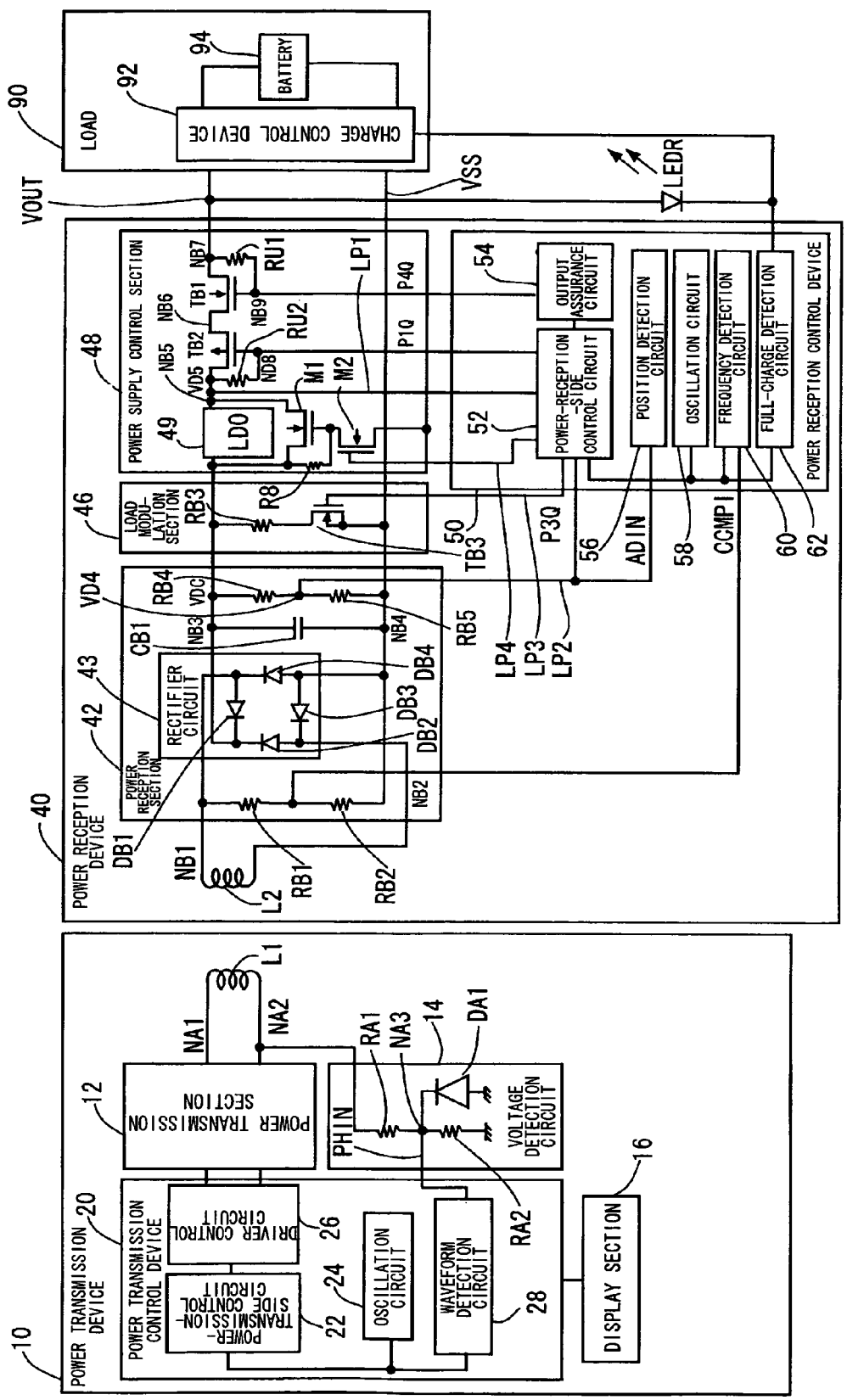
FIG. 2 is a view showing an example of a specific configuration of a power transmission device, a power transmission control device, a power reception device, and a power reception control device according to the invention.

FIG. 2 is a circuit diagram showing an example of a specific configuration of each section of a non-contact power transmission system which includes a power transmission device, a power reception device, and a load. As shown in FIG. 2, a power transmission device 10 includes a power transmission control device 20 and a power transmission section 12. A power reception device 40 includes a power reception section 40, a load modulation section 46, and a power supply control section 48. A load 90 includes a charge control device 92 and a battery (secondary battery) 94. The details are given below.

A power-transmission-side electronic instrument such as the charger 500 shown in FIG. 1A includes at least the power transmission device 10 shown in FIG. 2. A power-receiving-side electronic instrument such as the portable telephone 510 includes at least the power reception device 40 and the load 90. The configuration shown in FIG. 2 implements a non-contact power transmission (contactless power transmission) system in which power is transmitted from the power transmission device 10 to the power reception device 40 by electromagnetically coupling the primary coil L1 and the secondary coil L2 and power (voltage VOUT) is supplied to the load 90 from a voltage output node NB7 of the power reception device 40.

The power transmission device 10 (power transmission module or primary module) may include the primary coil L1, the power transmission section 12, a voltage detection circuit 14, a display section 16, and the power transmission control device 20. The power transmission device 10 and the power transmission control device 20 are not limited to the configuration shown in FIG. 2. Various modifications may be made such as omitting some elements (e.g., display section and voltage detection circuit), adding other elements, or changing the connection relationship.

Figure 3A:
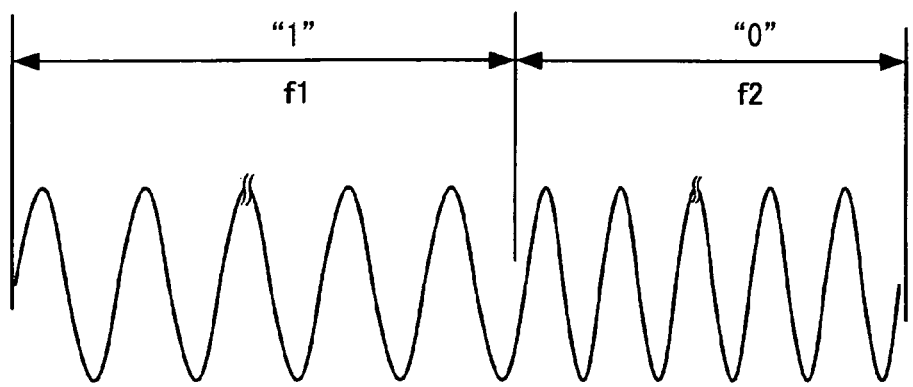
FIGS. 3A and 3B are views illustrative of the principle of information transmission between a primary-side instrument and a secondary-side instrument.

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1. As shown in FIG. 3A, the power transmission section 12 generates an alternating-current voltage at a frequency f1 when transmitting data "1" to the power reception device 40, and generates an alternating-current voltage at a frequency f2 when transmitting data "0" to the power reception device 40, for example. The power transmission section 12 may include a first power transmission driver which drives one end of the primary coil L1, a second power transmission driver which drives the other end of the primary coil L1, and at least one capacitor which forms a resonant circuit together with the primary coil L1. Each of the first and second power transmission drivers included in the power transmission section 12 is an inverter circuit (or buffer circuit) which includes a power MOS transistor, for example, and is controlled by a driver control circuit 26 of the power transmission control device 20.

The primary coil L1 (power-transmission-side coil) is electromagnetically coupled with the secondary coil L2 (power-receiving-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B.

When power transmission is unnecessary, the charger 500 and the portable telephone 510 are physically separated so that a magnetic flux of the primary coil L1 does not pass through the secondary coil L2.

The voltage detection circuit 14 is a circuit which detects an induced voltage in the primary coil L1. The voltage detection circuit 14 includes resistors RA1 and RA2 and a diode DA1 provided between a connection node NA3 of the resistors RA1 and RA2 and GND (low-potential-side power supply in a broad sense), for example. Specifically, a signal PHIN obtained by dividing the induced voltage in the primary coil L1 using the resistors RA1 and RA2 is input to a waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 is a device which controls the power transmission device 10. The power transmission control device 20 may be implemented by an integrated circuit device (IC) or the like. The power transmission control device 20 may include a control circuit 22 (power transmission side), an oscillation circuit 24, a driver control circuit 26, and the waveform detection circuit 28.

The control circuit 22 (control section) controls the power transmission device 10 and the power transmission control device 20. The control circuit 22 may be implemented by a gate array, a microcomputer, or the like. Specifically, the control circuit 22 performs sequence control and a determination process necessary for power transmission, load detection, frequency modulation, foreign object detection, detachment detection, and the like.

The oscillation circuit 24 includes a crystal oscillation circuit, for example. The oscillation circuit 24 generates a primary-side clock signal. The driver control circuit 26 generates a control signal at a desired frequency based on the clock signal generated by the oscillation circuit 24, a frequency setting signal from the control circuit 22, and the like, and outputs the generated control signal to the power transmission drivers (not shown) of the power transmission section 12 to control the operations of the power transmission drivers.

The waveform detection circuit 28 monitors the waveform of the signal PHIN which corresponds to the induced voltage at one end of the primary coil L1, and performs load detection, foreign object detection, and the like. For example, when a load modulation section 46 of the power reception device 40 modulates load in order to transmit data to the power transmission device 10, the signal waveform of the induced voltage in the primary coil L1 changes correspondingly.

Figure 3B:
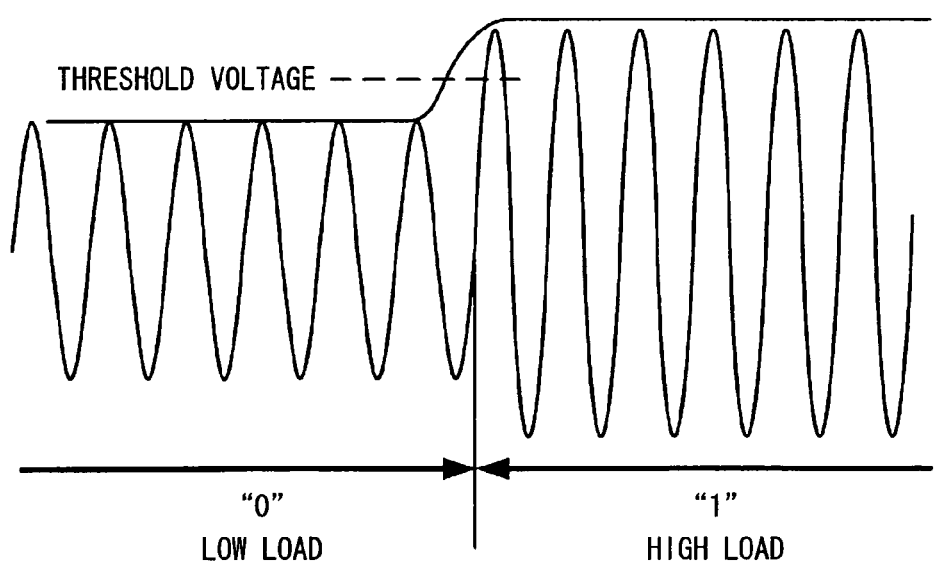

As shown in FIG. 3B, the amplitude (peak voltage) of the signal waveform decreases when the load modulation section 46 of the power reception device 40 reduces load in order to transmit data "0", and the amplitude of the signal waveform increases when the load modulation section 46 increases load in order to transmit data "1". Therefore, the waveform detection circuit 28 can determine whether the data transmitted from the power reception device 40 is "0" or "1" by determining whether or not the peak voltage has exceeded a threshold voltage as a result of a peak-hold process on the signal waveform of the induced voltage, for example. Note that the waveform detection method is not limited to the above method. For example, the waveform detection circuit 28 may determine whether the power-receiving-side load has increased or decreased using a physical quantity other than the peak voltage.

The power reception device 40 (power receiving module or secondary module) may include the secondary coil L2, a power reception section 42, the load modulation section 46, a power supply control section 48, and a power reception control device 50. The power reception device 40 and the power reception control device 50 are not limited to the configuration shown in FIG. 2. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC), the diode DB2 is provided between the node NB3 and a node NB2 at the other end of the secondary coil L2, the diode DB3 is provided between the node NB2 and a node NB4 (VSS), and the diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal VD4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a frequency detection signal input (ADIN).

The load modulation section 46 performs a load modulation process. Specifically, when the power reception device 40 transmits desired data to the power transmission device 10, the load modulation section 46 variably changes the load of the load modulation section 46 (secondary side) depending on transmission data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmission device in an authentication stage before normal power transmission starts, transistors TB1 and TB2 of the power supply control section 48 are turned OFF so that the load 90 is not electrically connected to the power reception device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 becomes the resistance RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed of a PMOS transistor (M1) is provided between the input terminal and the output terminal of the regulator (LDO) 49. A path which bypasses the regulator (LDO) 49 is formed by turning ON the PMOS transistor (M1) as the switch circuit. For example, since a power loss increases due to the equivalent impedance of the regulator 49 and heat generation increases under heavy load (e.g., when it is necessary to cause an almost constant large current to steadily flow in the initial stage of charging a secondary battery which has been exhausted to a large extent), a current is supplied to the load through the bypass path while avoiding the regulator.

An NMOS transistor (M2) and a pull-up resistor R8 which function as a bypass control circuit are provided in order to ON/OFF-control the PMOS transistor (M1) as the switch circuit.

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON, whereby a path which bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

A transistor TB2 (P-type CMOS transistor) is provided between a power supply voltage VD5 generation node NB5 (output node of regulator 49) and a transistor TB1 (node NB6), and is controlled based on a signal P1Q from the control circuit 52 of the power reception control device 50.

Specifically, the transistor TB2 is turned ON when ID authentication has been completed (established) and normal power transmission is performed.

A pull-up resistor RU2 is provided between the power supply voltage generation node NB5 and a node NB8 of the gate of the transistor TB2.

The transistor TB1 (P-type CMOS transistor) is provided between the transistor TB2 (node NB6) and the VOUT voltage output node NB7, and is controlled based on a signal P4Q from an output assurance circuit 54. Specifically, the transistor TB1 is turned ON when ID authentication has been completed and normal power transmission is performed. The transistor TB1 is turned OFF when connection of an AC adaptor has been detected or the power supply voltage VD5 is lower than the operation lower limit voltage of the power reception control device 50 (control circuit 52), for example. A pull-up resistor RU1 is provided between the voltage output node NB7 and a node NB9 of the gate of the transistor TB1.

The power reception control device 50 is a device which controls the power reception device 40. The power reception control device 50 may be implemented by an integrated circuit device (IC) or the like. The power reception control device 50 may operate based on the power supply voltage VD5 generated from the induced voltage in the secondary coil L2. The power reception control device 50 may include the control circuit 52 (power receiving side), the output assurance circuit 54, the position detection circuit 56, an oscillation circuit 58, the frequency detection circuit 60, and a full-charge detection circuit 62.

The power-receiving-side control circuit 52 controls the power reception device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, load modulation for authentication communication, load modulation for communication which enables foreign object insertion detection, and the like.

The output assurance circuit 54 is a circuit which assures the output from the power reception device 40 when the voltage is low (0 V). For example, when connection of an AC adaptor has been detected or the power supply voltage VD5 is lower than the operation lower limit voltage, for example, the output assurance circuit 54 causes the transistor TB1 to be turned OFF to prevent a backward current flow from the voltage output node NB7 to the power reception device 40.

The position detection circuit 56 monitors the waveform of the signal ADIN which corresponds to the waveform of the induced voltage in the secondary coil L2, and determines whether or not the positional relationship between the primary coil L1 and the secondary coil L2 is appropriate. Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit, for example. The oscillation circuit 58 generates a secondary-side clock signal. The frequency detection circuit 60 detects the frequency (f1 or f2) of the signal CCMPI, and determines whether the data transmitted from the power transmission device 10 is "1" or "0".

The full-charge detection circuit 62 (charge detection circuit) is a circuit which detects whether or not the battery 94 of the load 90 has been full-charged (charged). Specifically, the full-charge detection circuit 62 detects the full-charge state by detecting whether a light-emitting device LEDR used to display the charge state is turned ON or OFF, for example. The full-charge detection circuit 62 determines that the battery 94 is in a full-charge state (charging has been completed) when the light-emitting device LEDR has been turned OFF for a given period of time (e.g., five seconds). The charge control device 92 of the load 90 also detects the full-charge state based on the ON/OFF state of the light-emitting device LEDR.

The load 90 includes the charge control device 92 which controls charging the battery 94 and the like. The charge control device 92 detects the full-charge state based on the ON/OFF state of the light-emitting device (LEDR). The charge control device 92 (charge control IC) may be implemented by an integrated circuit device or the like. The battery 94 may be provided with the function of the charge control device 92 (e.g., smart battery). Note that the load 90 is not limited to a secondary battery.

Foreign Matter Insertion Measures

Foreign matter insertion measures are described below. A foreign object may be inserted between the primary coil and the secondary coil after the instrument has been authenticated and normal power transmission has commenced. A foreign object may be inserted accidentally or intentionally. Since heat is produced when a foreign object is inserted, a skin burn or damage to or destruction of the instrument may occur. Therefore, safety measures against foreign object insertion are indispensable for the non-contact power transmission system.

Figure 4A:
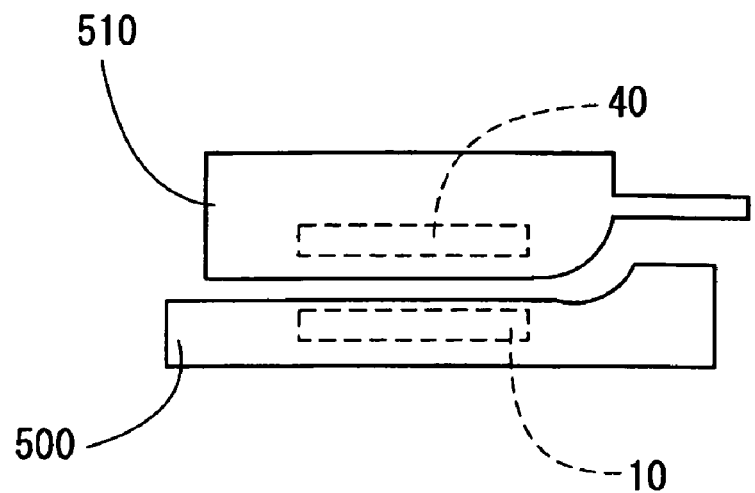
FIGS. 4A and 4B are cross-sectional view showing electronic instruments which form a non-contact power transmission system and illustrative of insertion of a foreign object after normal power transmission has started.
Figure 4B:
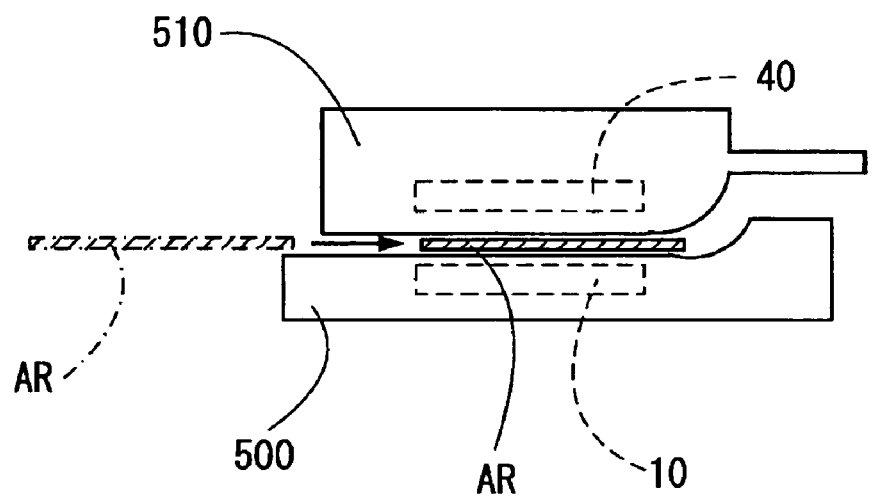

FIGS. 4A and 4B are cross-sectional views showing the electronic instruments which form the non-contact power transmission system and illustrative of insertion of a foreign object after normal power transmission has started. FIG. 4A is a view showing a normal power transmission state, and FIG. 4B is a view showing a state in which a foreign object is inserted.

In FIG. 4A, the portable telephone terminal 510 (electronic instrument including the power reception device 40) is placed at a given position on the cradle 500 (electronic instrument including the power transmission device 10). Non-contact power transmission is performed from the cradle 500 (charger) to the portable telephone terminal 510 through the primary coil and the secondary coil so that the secondary battery (e.g., battery pack) provided in the portable telephone terminal 500 is charged.

In FIG. 4B, a thin sheet-shaped metal foreign object (conductive foreign object) AR is intentionally inserted between the cradle 500 (charger) and the portable telephone terminal 510 during normal power transmission. When the foreign object AR has been inserted, power supplied from the primary-side instrument (cradle 500) to the secondary-side instrument (portable telephone terminal 510) is almost entirely consumed by the foreign object (AR) (i.e., transmitted power is taken over), whereby the foreign object AR is likely to generate heat. When the state shown in FIG. 4B has occurred, the power transmission device 10 included in the primary-side instrument (cradle 500) must detect insertion of the foreign object AR and immediately stop normal power transmission.

Figure 5A:
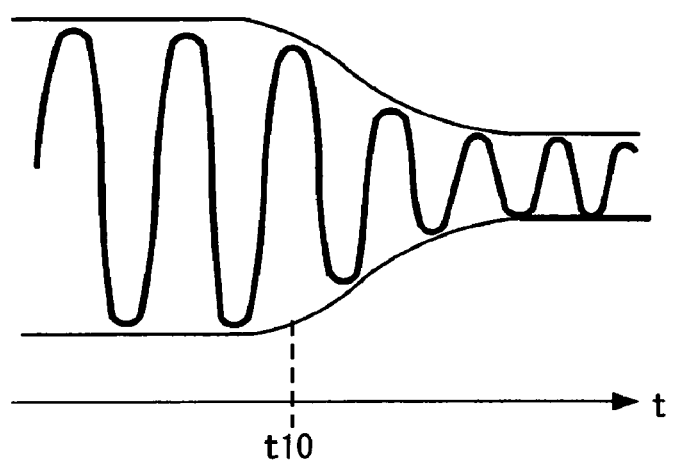
FIGS. 5A and 5B are views illustrative of matters which should be taken into consideration when detecting a foreign object by monitoring the load of a power reception side with respect to the power transmission device.
Figure 5B:
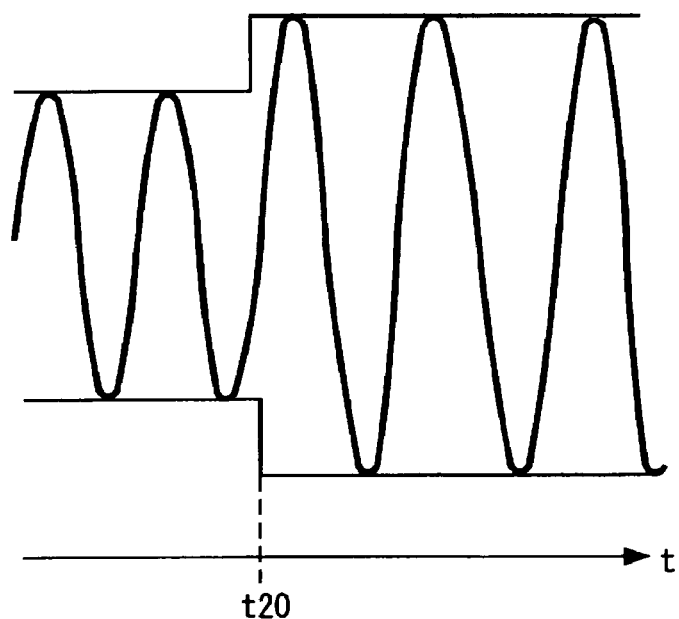

Detection of foreign object insertion is discussed below. FIGS. 5A and 5B are views illustrative of matters which should be taken into consideration when detecting a foreign object by monitoring the load of the power reception side with respect to the power transmission device. FIG. 5A is a view showing a change in the load of the power reception side with respect to the power transmission device while normally charging the secondary battery of the portable telephone terminal shown in FIG. 4. FIG. 5B is a view showing the case where an abnormal change in the load of the power reception side with respect to the power transmission device has occurred during charging.

As described above, the amplitude of the voltage induced in the primary coil increases when the load of the power reception device side increases, and the amplitude of the voltage induced in the primary coil decreases as the load of the power reception device side decreases. When the secondary battery of the portable telephone terminal 510 shown in FIG. 4 is normally charged, the load of the power reception device 40 gradually decreases with the passage of time. Therefore, the voltage waveform of the primary coil changes as shown in FIG. 5A when the secondary battery is normally charged. In FIG. 5A, the secondary battery transitions from a constant current mode (CC mode) to a constant voltage mode (CV mode) at a time t10. Therefore, the load of the power reception device 40 gradually decreases after the time t10.

In FIG. 5B, the load of the power reception device 40 rapidly increases at a time t20. In this case, since the power transmission device 10 monitors a change in the load of the power reception device 40, the power transmission device 10 can detect that the load has rapidly increased. However, the power transmission device 10 cannot determine whether the increase in load has occurred due to the load (secondary battery of portable telephone terminal), mispositioning between the portable telephone terminal 510 and the cradle 500, or insertion of a foreign object. Therefore, insertion of a foreign object cannot be detected using a method which causes the power transmission device 10 to merely detect a change in the load of the power reception device 40.

In this embodiment, the power reception device 40 intermittently changes the load of the power reception side with respect to the power transmission device 10 during normal power transmission while supplying power to the load of the power reception device (e.g., secondary battery 94), and transmits information to the power transmission device 10.

The following items are confirmed when the power transmission device 10 can detect the information obtained by intermittently changing the load at a given timing.

(1) The instrument including the power reception device 10 (i.e., portable telephone terminal 510 shown in FIG. 4) is appropriately positioned on the instrument including the power transmission device 10 (i.e., cradle 500 shown in FIG. 4).

(2) The instrument including the power reception device 10 (including the secondary battery of the portable telephone terminal 510 shown in FIG. 4) is operating normally.

(3) The foreign object AR is not inserted.

When the foreign object AR is inserted during normal power transmission, the information transmitted from the power reception device 40 is blocked by the foreign object AR and does not reach the power transmission device 10. Specifically, the power transmission device 10 cannot detect an intermittent change in the load of the power reception side (the power-reception-side load).

It is most likely that an intermittent change in load cannot be detected after the above items (1) to (3) have been confirmed because the foreign object AR has been inserted (item (3)). Specifically, the power transmission device 10 can determine that the power transmission device 10 has become unable to detect an intermittent change in load of the power reception side with respect to the power transmission device since the foreign object AR has been inserted.

Figure 6A:
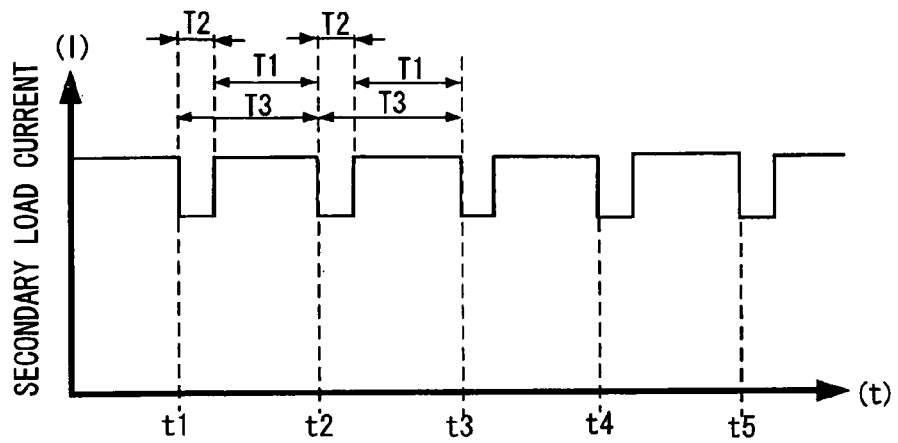
FIGS. 6A and 6B are views illustrative of a specific mode when intermittently changing the load of a power reception side so that insertion of a foreign object can be detected.
Figure 6B:
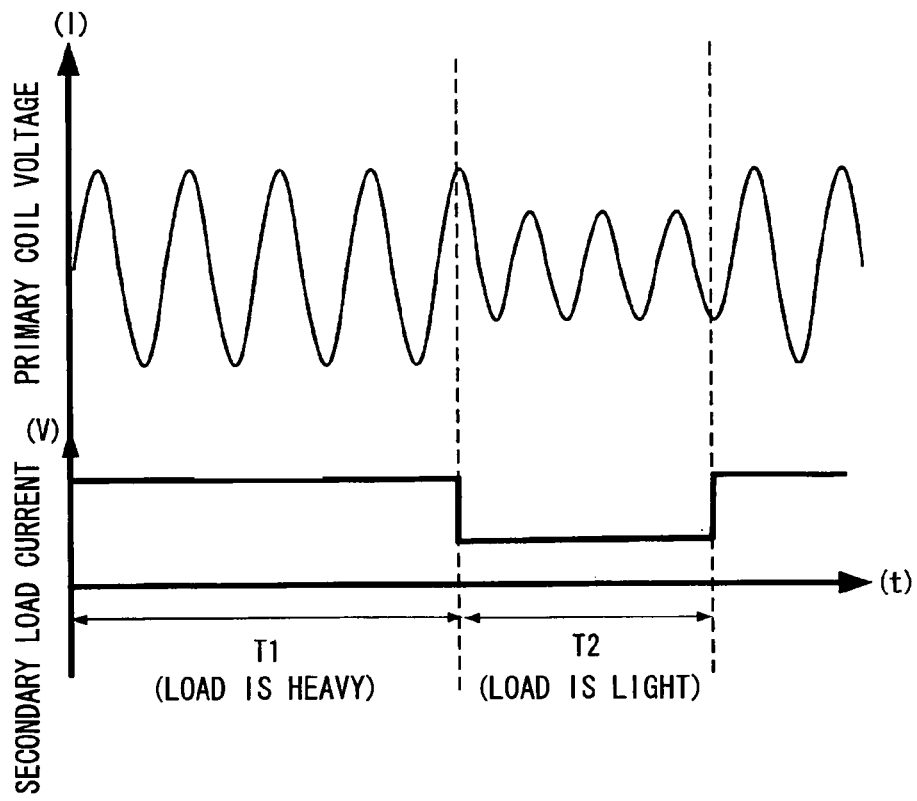

FIGS. 6A and 6B are views illustrative of a specific mode when intermittently changing the load of the power reception device so that insertion of a foreign object can be detected.

In FIG. 6A, an intermittent change in the load of the power reception device is indicated by a change in secondary current (current which flows through the secondary coil L2). As shown in FIG. 6A, the load of the power reception device intermittently changes at times t1, t2, t3, t4, t5, . . . .

In FIG. 6A, the load changes in a cycle T3. The load decreases in a period T2 starting from the time t1, and increases in the subsequent period T1, for example. Such a periodic change is repeated in the cycle T3.

FIG. 6B shows a change in primary coil voltage (induced voltage at one end of the primary coil) with respect to a change in secondary load current. The secondary-side load increases in the period T1 and decreases in the period T2, as described above. The amplitude (peak value) of the induced voltage (primary coil voltage) at one end of the primary coil (L1) changes corresponding to a change in secondary-side load. Specifically, the amplitude increases in the period T1 in which the load increases, and decreases in the period T2 in which the load decreases. Therefore, the power transmission device 10 can detect a change in the load of the power reception device 40 by detecting the peak of the primary coil voltage using the waveform detection circuit 28 (see FIG. 2). Note that the load change detection method is not limited to the above method. For example, the phase of the primary coil voltage or the primary coil current may be detected.

The load of the power reception side (the power-reception-side load) can be easily modulated by switching the transistor, for example. The peak voltage of the primary coil or the like can be accurately detected using an analog or digital basic circuit. Therefore, the above method does not impose load on the instrument to a large extent while facilitating implementation. The above method is also advantageous in terms of a reduction in mounting area and cost.

As described above, insertion of a foreign object can be simply and accurately detected without adding a special configuration by employing a novel method in which the power reception device 40 transmits information obtained by intermittently (and cyclically) changing the load during normal power transmission and the power transmission device 10 detects the change in load.

Second Embodiment

This embodiment illustrates a specific configuration and operation suitable for detecting insertion of a foreign object.

Specific example of foreign object insertion detection

Figure 7:
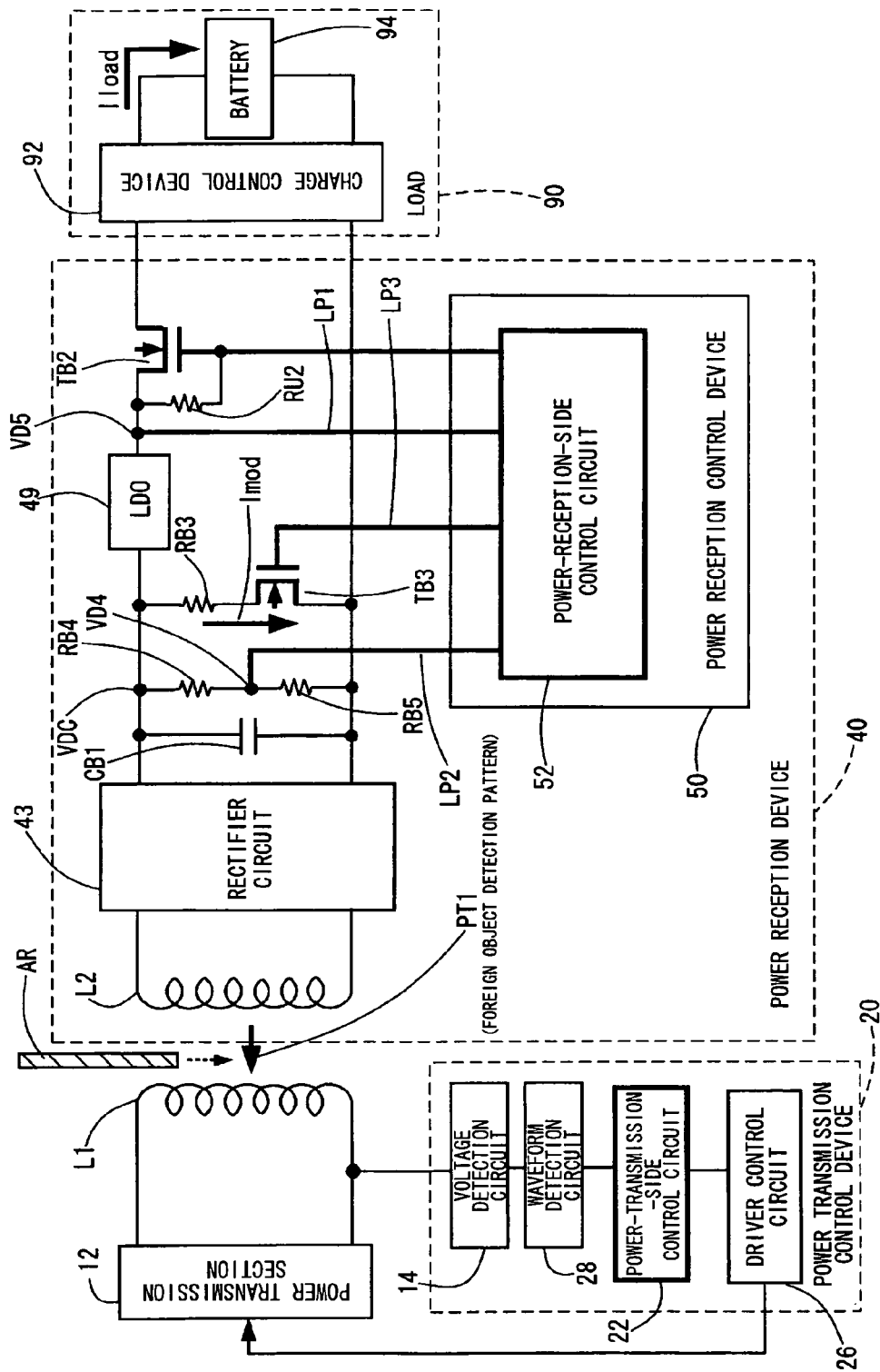
FIG. 7 is a circuit diagram showing the main configuration of a non-contact power transmission system shown in FIG. 2 relating to detection of insertion of a foreign object.

FIG. 7 is a circuit diagram showing the main configuration of the non-contact power transmission system shown in FIG. 2 relating to detection of insertion of a foreign object. In FIG. 7, the same sections as in FIG. 2 are indicated by the same reference symbols. In FIG. 7, a bold line indicates a portion that plays an important role in detecting insertion of a foreign object.

A notable circuit configuration of the power reception device 40 shown in FIG. 7 includes the load modulation transistor TB3 of the load modulation section 46 (see FIG. 2), the power supply control transistor TB2 of the power supply control section 48 (see FIG. 2), and the power-receiving-side control circuit 52 which ON/OFF-controls these transistors (TB2 and TB3). It is also important that the voltages at the input terminal and the output terminal of the series regulator (LDO) 49 are input to the power-receiving-side control circuit 52 through the signal lines LP2 and LP1 so that the load state (degree of load) of the battery 94 (secondary battery) included in the load 90 can be detected by monitoring the voltage across the series regulator (LDO) 49.

The configuration of the power transmission control device 20 of the power transmission device 10 (see FIG. 2) is also important. Specifically, it is important that the peak value (amplitude) of the induced voltage in the primary coil (L1) is detected by the waveform detection circuit 28 and a change in the load of the power reception side with respect to the power transmission device (the power-reception-side load) is detected by the power-transmission-side control circuit 22.

In FIG. 7, the power reception device 40 modulates the load (the power-reception-side load) during normal power transmission (continuous power transmission after authentication), and transmits a foreign object detection pattern PT1 to the power transmission device 10. The power-transmission-side control circuit 22 of the power transmission device 10 (successively or intermittently) monitors a change in the load of the power reception side during normal power transmission. The power-transmission-side control circuit 22 determines that the foreign object AR has been inserted when the power-transmission-side control circuit 22 has become unable to receive the foreign object detection pattern PT1, and stops normal power transmission.

Specific Mode of Foreign Object Detection Pattern PT1

Figure 8A:
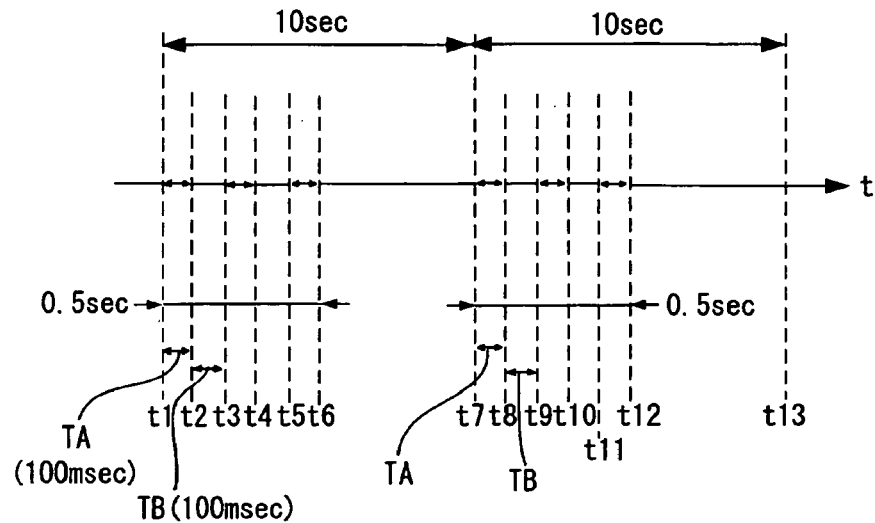
FIGS. 8A and 8B are views illustrative of a preferred and specific mode of load modulation which enables detection of a foreign object.
Figure 8B:
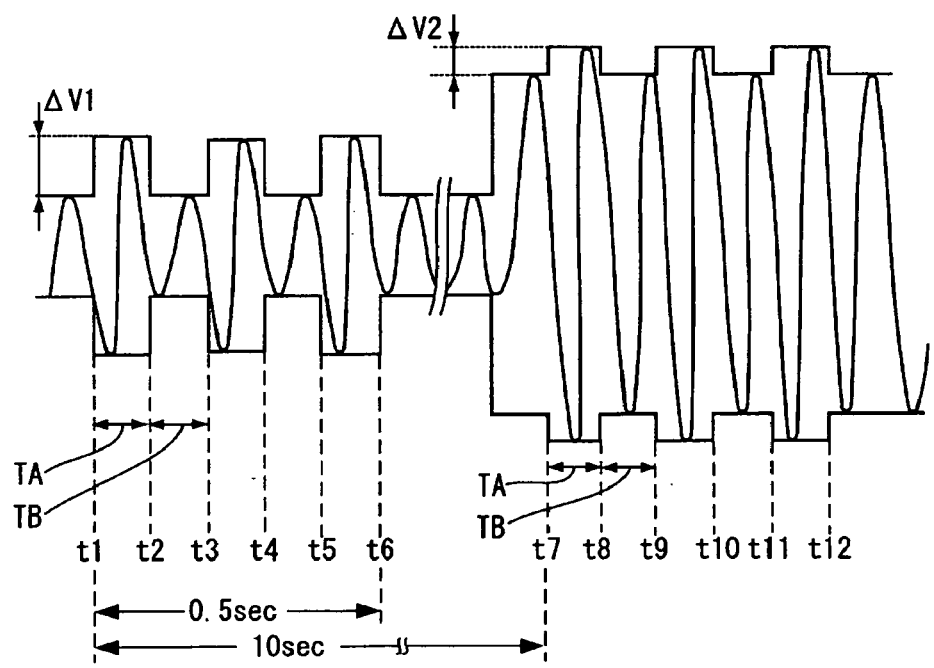

FIGS. 8A and 8B are views illustrative of a preferred and specific mode of load modulation which enables detection of a foreign object. FIG. 8A is a view showing a timing example of load modulation, and FIG. 8B is a view showing a change in the load of the power reception side detected by the power transmission device in detail.

As shown in FIG. 8A, load modulation which enables detection of a foreign object is cyclically performed in a cycle of 10 sec.

Load modulation which enables detection of a foreign object is performed in a period from time t1 to t6 and a period from time t7 to t12. A period from time t1 to t6 (from time t7 to t12) is 0.5 sec. The degree of load is changed in units of 0.1 sec (100 msec) obtained by equally dividing 0.5 sec by five.

In FIG. 8A, a bold bidirectional line indicates a period in which the load increases. Specifically, the load increases in a period from time t1 to t2, a period from time t3 to t4, a period from time t5 to t6, a period from time t7 to t8, a period from time t9 to t10, and a period from time t11 to t12. A period in which the load increases is referred to as a period TA.

The load decreases in a period from time t2 to t3, a period from time t4 to t5, a period from time t8 to t9, and a period from time t10 to t11. A period in which the load decreases is referred to as a period TB.

In FIG. 8A, the load of the power reception device is intermittently changed cyclically (i.e., in cycle units (in units of one cycle)) during normal power transmission, and the load (the power-reception-side load) is intermittently changed a plurality of times at given intervals within one cycle.

The power transmission device 10 and the power reception device 40 can transfer the information relating to a change in load in synchronization by cyclically changing the load (i.e., the power transmission device 10 can easily determine the timing at which the load of the power reception device 40 changes).

The power transmission device 10 can easily determine whether a change in load (the power-reception-side load) is noise or a normal signal when detecting a change in load (the power-reception-side load) by intermittently changing the load a plurality of times at given intervals within one cycle, whereby the foreign object detection accuracy can be increased. Specifically, when the load changes only once within one cycle, it may be difficult to determine whether a change in load with respect to the power transmission device 10 occurs accidentally or due to load modulation. On the other hand, when the load changes a plurality of times within one cycle, it is easy to determine that the change in load has occurred due to load modulation.

In FIG. 8A, the load is intermittently changed a plurality of times at given intervals only in a given period (times t1 to t6) within one cycle (e.g., times t1 to t7). Specifically, load modulation is performed only in the first period (0.5 sec) of one cycle (10 sec). Load modulation is performed in this manner for the following reasons.

Specifically, since a change in load (load modulation) during normal power transmission may affect power supply to the load (battery 94 shown in FIG. 7), it is undesirable to frequently change the load to a large extent. Therefore, one cycle of load modulation is increased to some extent (foreign object can be detected even if the cycle of load modulation is increased to some extent).

The load (the power-reception-side load) is intermittently changed a plurality of times at given intervals only in a given period within one cycle. Specifically, when the load change interval is increased to a large extent, the power transmission device may not appropriately detect an intermittent change in the load of the power reception device due to a change in the load state of the load with the passage of time or a change in surrounding conditions. Therefore, one cycle is increased (10 sec in FIG. 8A), and the load is intermittently modulated a plurality of times (five times in FIG. 8A) only in a short period (0.5 sec in FIG. 8A) within one cycle, for example.

The power transmission device 10 can detect a foreign object (AR) with high accuracy while minimizing an effect on power supply to the load (94) (e.g., charging a battery pack 94) by performing load modulation in this manner.

FIG. 8B shows an example of a change in the amplitude of the induced voltage at one end of the primary coil (L1) of the power transmission device 10 corresponding to the load of the power reception side with respect to the power transmission device. In FIG. 8B, the load state of the load (battery 94) differs between a load modulation period (t1 to t6) in the first cycle and a load modulation period (t7 to t12) in the second cycle. The load state of the load (battery 94) increases in the second cycle so that the peak value of the primary coil voltage increases.

At times t1 to t6 in FIG. 8B, the difference between the primary coil voltage in the period TA in which the load increases and the primary coil voltage in the period TB in which the load decreases is $\Delta V1$. The power-transmission-side control circuit 22 of the power transmission device 10 can detect a change in the load of the power reception device 40 from the difference $\Delta V1$ in the amplitude of the primary coil voltage.

In the second load modulation period (times t7 to t12), since the load state of the load (battery 94) increases so that a charging current (Iload) supplied to the load (battery) 94 increases, the ratio of a modulation current (Imod) due to load modulation to the charging current (Iload) decreases so that the difference in primary coil voltage caused by turning the modulation current (Imod) ON/OFF decreases to $\Delta V2$ ($\Delta V2 < \Delta V1$). Specifically, the modulation current (Imod) is buried in the charging current (Iload) supplied to the load (battery 94). Therefore, when the load (battery 94) is heavy, it is difficult for the power transmission device 10 to detect a change in load as compared with the case where the load is light. In this embodiment, the load state of the load (battery 94) is compulsorily reduced by reducing the amount of power supplied to the load (battery 94) so that the primary-side device can easily detect a change in load (the power-reception-side load) due to load modulation. The load reduction measures are described below.

Compulsory Load Reduction Measures

In this embodiment, since load modulation is performed without stopping power supply to the load (battery) 94 during normal power transmission, transmission of the signal due to load modulation to the power transmission device 10 is always affected by the state of power supply to the load 94 (i.e., the load state of the battery). As described above, even if a small current is turned ON/OFF for load modulation when a large amount of charging current is supplied to the load 94 (e.g., battery pack), since the amount of ON/OFF current (Imod) is smaller than the amount of charging current (Iload) supplied to the load (94), it is difficult for the power transmission device 10 to detect a change in load due to load modulation (i.e., it is difficult for the power transmission device 10 to detect whether a change in load is noise or a signal due to load modulation). On the other hand, the relative ratio of the ON/OFF current (Imod) due to load modulation increases when the amount of current supplied to the load 94 is small (when the load is light), so that the power transmission device 10 can easily detect a change in load due to the ON/OFF operation.

According to this embodiment, the power reception device 40 monitors the load state of the load 94 during normal power transmission, and, when the load 94 is heavy (i.e., a large amount of current is supplied to the load 94) when the power reception device 40 performs load modulation which enables detection of a foreign object, the amount of power supplied to the load 94 is compulsorily reduced based on the above consideration. The amount of power supply is merely reduced without stopping power supply to the load 94 so that at least a minimum amount of power is supplied to the load 94.

Since the load state of the load 94 is apparently reduced by reducing the amount of power supplied to the load 94, the power transmission device 10 can easily detect the signal due to load modulation. Therefore, the foreign object detection accuracy is maintained at a desired level even when the load 94 is heavy. Since at least a minimum amount of power is always supplied to the load 94 even when compulsorily reducing the load 94, a problem in which the electronic circuit (charge control device 92) of the load 94 cannot operate does not occur.

Moreover, since load modulation which enables detection of insertion of a foreign object is intermittently performed at appropriate intervals taking the effect on power supply to the load 94 into consideration, as stated above, power supply to the load 94 is not adversely affected even if the load 94 is compulsorily reduced. For example, a problem in which the charging time of the battery pack 94 increases to a large extent does not occur.

Therefore, the load change detection accuracy of the power transmission device 10 can be maintained at a desired level even if the load 94 is heavy by causing the power reception device 40 to monitor the state of the load 94 and compulsorily reduce the load state of the load 94, as required, when performing load modulation which enables detection of insertion of a foreign object.

Figure 9A:
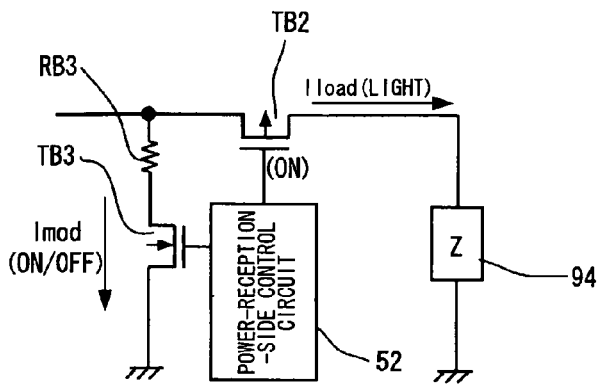
FIGS. 9A to 9E are views illustrative of the operation of reducing the load.
Figure 9B:
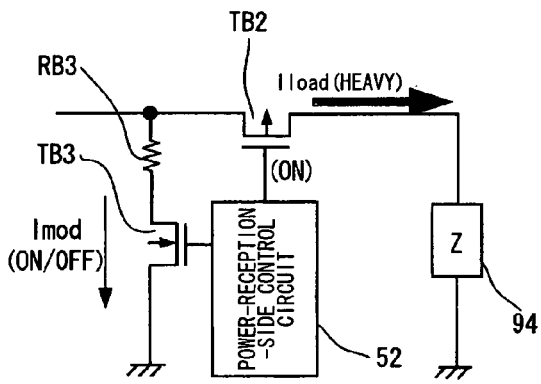
Figure 9C:
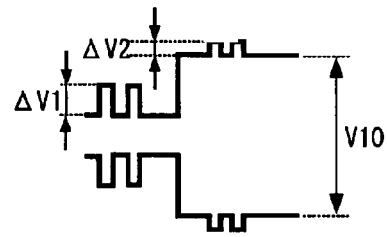
Figure 9D:
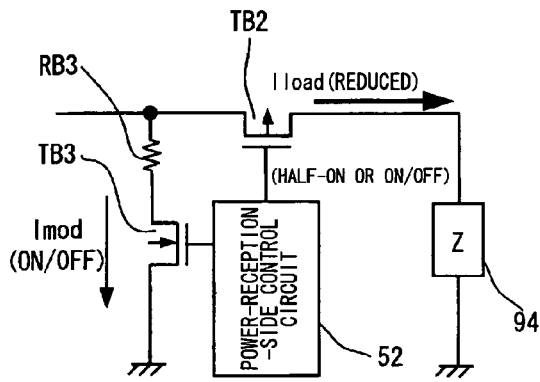
Figure 9E:
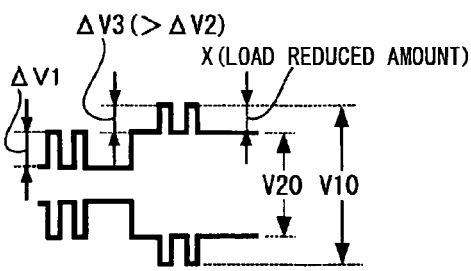

FIGS. 9A to 9E are views illustrative of the operation of reducing the load. FIG. 9A is a view showing a state in which the load is light. FIG. 9B is a view showing a state in which the load is heavy. FIG. 9C is a view showing a change in primary coil voltage in the state shown in FIG. 9B. FIG. 9D is a view showing a state in which the load is reduced by turning the power supply control transistor ON/OFF or setting the power supply control transistor in a half ON state. FIG. 9E is a view showing a change in primary coil voltage in the state shown in FIG. 9D.

In FIG. 9A, since the load (battery) 94 is light (i.e., the charging current Iload supplied to the load is small), the power transmission device 10 can sufficiently detect a change in load due to load modulation without causing the power reception device 40 to perform the operation of reducing the load. Therefore, the power supply control transistor TB2 is always turned ON. The load modulation transistor TB3 is intermittently turned ON/OFF so that load modulation is performed.

In FIG. 9B, since the load (battery) 94 is heavy (i.e., the charging current Iload supplied to the load is large), a change in modulation current (Imod) due to the ON/OFF operation is observed to a small extent. As shown in FIG. 9C, when the load increases, the difference in amplitude of the primary coil voltage decreases from $\Delta V1$ to $\Delta V2$, whereby it becomes difficult to detect a change in load due to load modulation.

In FIG. 9D, the power reception device 40 performs the operation of reducing the load when performing load modulation. In FIG. 9D, the power reception device 40 successively turns the power supply control transistor TB2 ON/OFF or set the power supply control transistor TB2 in a half ON state.

Specifically, the amount of power supplied to the load 94 can be compulsorily reduced using a digital method which causes the power reception device 40 to successively turn the power supply control transistor TB2 provided in a power supply path ON/OFF to intermittently supply power to the load 94. The operation of successively switching a transistor is generally employed for a digital circuit and is easily implemented. Moreover, it is possible to accurately reduce the amount of power supplied to the load by selecting the switching frequency.

The amount of power supplied to the load 94 can be also reduced using an analog method in which an intermediate voltage between a complete ON voltage and a complete OFF voltage is supplied to the gate of the power supply control transistor (PMOS transistor) to set the PMOS transistor in a half ON state. This method has an advantage in that the on-resistance of the power supply control transistor (PMOS transistor) can be finely adjusted by controlling the gate voltage.

In FIG. 9E, the amplitude of the primary coil voltage in a state in which the load is heavy changes from V10 to V20 by compulsorily reducing the load. In FIG. 9E, "X" indicates the amount of the load 94 compulsorily reduced. The difference in amplitude of the primary coil voltage increases from $\Delta V2$ (see FIG. 9C) to $\Delta V3$ ($\Delta V3 > \Delta V2$) by compulsorily reducing the load 94, whereby the power transmission device 10 can easily detect a change in the load of the power reception device 40 due to load modulation.

The power transmission device can reliably detect a change in load (the power-reception-side load) even when the load (94) of the power reception device is heavy by causing the power reception device to reduce the load (94) while performing load modulation. Note that the load reduction process may be uniformly performed during load modulation without monitoring the load state of the load. In this case, load imposed on the power reception control device is reduced to such an extent that the load state of the load (94) is not monitored.

Load State Monitoring

The operation of reducing the load 94 is performed during load modulation which enables detection of insertion of a foreign object only when the load 94 is heavy, as described above. Therefore, the power reception device 40 monitors the state of the load 94 in order to appropriately perform the load reducing operation. The load may be monitored using methods shown in FIGS. 10A to 10C (the method is not limited thereto).

Figure 10A:
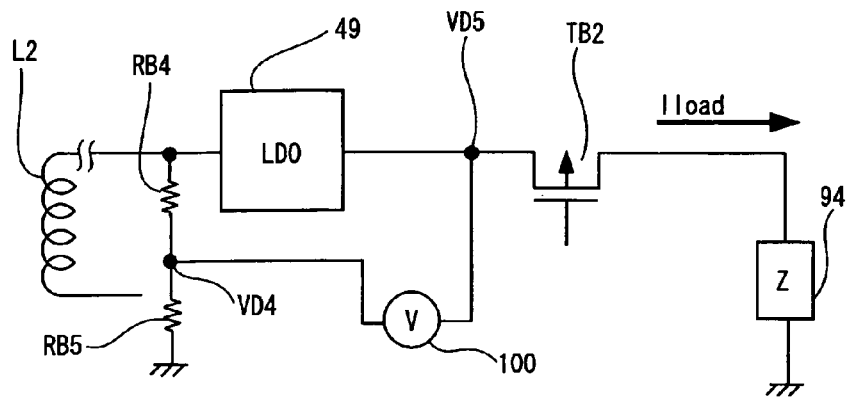
FIGS. 10A to 10C are views respectively showing a method of monitoring the state of a load.
Figure 10B:
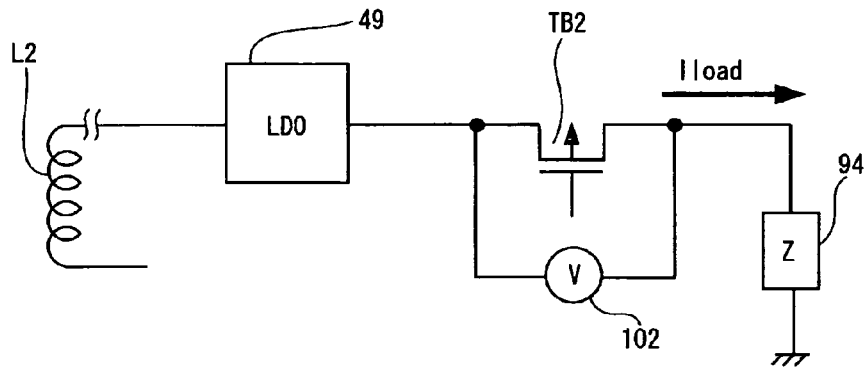
Figure 10C:
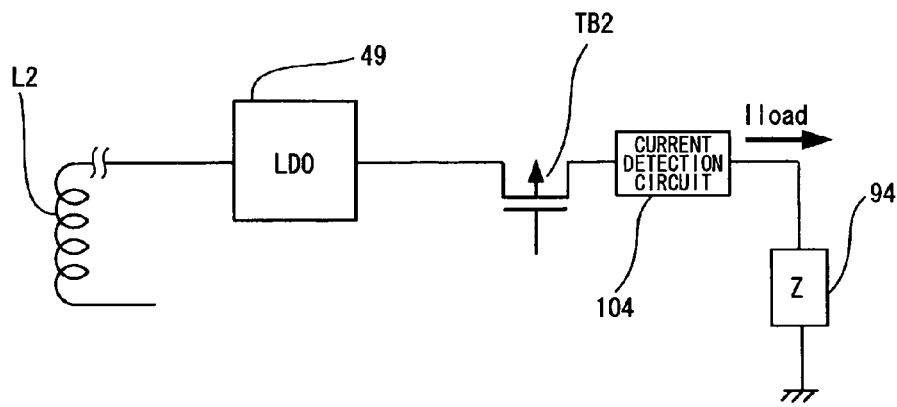

FIGS. 10A to 10C are views respectively showing a method of monitoring the state of the load. The monitoring of the load may be performed constantly or intermittently. On the other hand, highly accurate load monitoring must be implemented by a simple configuration.

In FIG. 10A, the voltage across the series regulator (LDO) 49 which functions as a constant voltage circuit (power supply circuit) is monitored to detect the state of the load 94. In FIG. 10A, reference numeral 100 indicates a voltage detection circuit.

The series regulator (LDO) 49 is a voltage-drop-type and continuous-current-type power supply circuit. The voltage at the output terminal of the series regulator (LDO) 49 is constant, but the potential at the input terminal of the series regulator (LDO) 49 changes depending on the voltage at the end of the primary coil. Since the voltage at the end of the primary coil changes depending on the load state of the load, the state of the load 94 can be detected by monitoring the voltage across the series regulator (LDO) 49.

As shown in FIG. 2, it is necessary to monitor the voltage at the input terminal of the series regulator (LDO) 49 in order to detect the frequency, for example. On the other hand, the voltage at the output terminal of the series regulator (LDO) 49 is also used as the power supply voltage of the power-receiving-side control circuit 52, for example. Therefore, a special circuit is unnecessary in order to detect the voltages at the input terminal and the output terminal of the series regulator (LDO) 49 so that this method can be very easily implemented.

In FIG. 10B, the load state of the load 94 is monitored by detecting the voltage across the power supply control transistor (TB2). Since the voltage across the power supply control transistor (TB2) changes depending on the amount of current supplied to the load 94, the state of the load (94) can be detected by monitoring the voltage across the power supply control transistor (TB2). In FIG. 10B, reference numeral 102 indicates a voltage detector. This detection method can also be implemented without adding a special circuit.

In FIG. 10C, the load state of the load 94 is monitored by directly detecting the amount of current which flows through the power supply path of the power supply control section 48 (see FIG. 2). In FIG. 10C, reference numeral 104 indicates a current detector. Since the amount of current supplied to the load 94 is small when the load 94 is light and increases as the load 94 increases, the state of the load 94 can be monitored by directly detecting the amount of current which flows through the power supply path. This method has an advantage in that the state of the load 94 can be detected with high accuracy.

Specific Operation of Power Transmission Device

A specific operation of the power transmission control device 20 shown in FIG. 7 is described below. As described above, the power-transmission-side control circuit 22 included in the power transmission control device 20 determines that a foreign object (AR) has been inserted between the primary coil (L1) and the secondary coil (L2) when the power-transmission-side control circuit 22 cannot detect an intermittent change in the load of the power reception side (the power-reception-side load) during normal power transmission, and stops power transmission. This reliably prevents heat generation from the foreign object (AR), a skin burn, and damage to and destruction of the instrument. Therefore, highly reliable foreign object insertion measures are implemented in a non-contact power transmission system.

Since it is necessary to carefully determine the presence or absence of insertion of a foreign object, it is preferable that the power-transmission-side control circuit 22 detect a change in load in cycle units and determine that a foreign object has been inserted between the primary coil and the secondary coil when the power-transmission-side control circuit 22 cannot detect a change in load over a given number of cycles.

For example, the power-transmission-side control circuit 22 detects a change in the load of the power reception device in cycle units, and stops normal power transmission when the power-transmission-side control circuit 22 cannot detect a change in load over a given number of cycles (e.g., three cycles). This increases the foreign object insertion detection accuracy, thereby preventing a situation in which the power-transmission-side control circuit 22 erroneously stops normal power transmission when a change in load cannot be detected due to an accidental factor.

A change in the load of the power reception device 40 with respect to the power transmission device 10 can be detected by detecting the waveform of the induced voltage in the primary coil (L1). The waveform can be detected using the waveform detection circuit 22.

Since the peak value (amplitude) of the waveform of the induced voltage in the primary coil (L1) increases when the load of the power reception device 40 is heavy and decreases when the load of the power reception device 40 is light, a change in the load of the power reception device 40 can be detected by detecting the peak of the waveform. Note that the load change detection method is not limited to the above method. For example, the phase of the induced voltage or current in the primary coil may be detected.

According to this embodiment, a novel power reception device 40 is implemented which has a function of transmitting a signal that enables detection of insertion of a foreign object during normal power transmission to the power transmission device, and a novel power transmission device 10 is implemented which has a function of receiving a signal due to load modulation by the power reception device 40 during normal power transmission and detecting insertion of a foreign object based on whether or not the signal can be received.

An electronic instrument (e.g., portable telephone terminal) which includes the power reception device 40 is highly safe since the electronic instrument can deal with insertion of a foreign object when supplying power to the load 94. Therefore, the user can use the electronic instrument without worry.

An electronic instrument (e.g., portable telephone charger) which includes the power transmission device 10 is highly safe since the electronic instrument can deal with insertion of a foreign object when power is supplied to the load 94. Therefore, the user can use the electronic instrument without worry.

As described above, some embodiments of the invention enable insertion of a foreign object between a primary coil and a secondary coil to be accurately detected by simple signal processing while reducing the number of parts to implement highly reliable safety measures relating to non-contact power transmission.

According to the embodiments of the invention, the following main effects can be obtained, for example. Note that the following effects are not necessarily achieved at the same time. Accordingly, the following effects do not in any way limit the scope of the invention.

(1) Since the load of the power reception device side is intermittently changed by load modulation and a signal useful for foreign object detection is transmitted from the power reception device to the power transmission device during normal power transmission, the power transmission device can determine whether or not a foreign object has been inserted based on whether or not the power transmission device can receive the above signal.

(2) Since the load modulation section included in the power reception device is also utilized to transmit a signal which enables detection of insertion of a foreign object, dedicated hardware need not be provided to detect a foreign object.

(3) Dedicated hardware which detects insertion of a foreign object need not be provided in the power transmission device by utilizing a circuit which monitors the load of the power reception device and is provided in the power transmission device.

(4) A change in the load of the power reception side with respect to the power transmission device (the power-reception-side load) can be relatively easily detected by detecting the waveform of the induced voltage in the primary coil, for example (note that the detection method is not limited thereto). A change in the load of the power reception side can be accurately detected by general digital signal processing.

(5) Since the signal due to load modulation is transmitted from the power reception device to the power transmission device utilizing the same path as the path used for normal power transmission (i.e., path through the primary coil and the secondary coil), a dedicated transmission path for the signal which enables detection of insertion of a foreign object need not be provided.

(6) The power transmission device and the power reception device can transfer the information relating to a change in load in synchronization by cyclically changing the load of the power reception device during normal power transmission. Moreover, the power transmission device can easily determine whether a change in load is noise or a normal signal when detecting a change in load by intermittently changing the load a plurality of times at given intervals within one cycle, whereby the foreign object detection accuracy can be increased.

(7) The power reception device monitors the load state of the load (e.g., battery pack) during normal power transmission, and, when the load is heavy when the power reception device performs load modulation which enables detection of a foreign object, the amount of power supplied to the load is compulsorily reduced to reduce the load state of the load. Therefore, the power transmission device can easily detect the signal due to load modulation even when the load is heavy. Therefore, the foreign object detection accuracy can be maintained at a desired level even when the load is heavy. Since at least a minimum amount of power is always supplied to the load (i.e., power supply to the load is not stopped) even when compulsorily reducing the load, a problem in which the electronic circuit of the load cannot operate does not occur. Moreover, since load modulation which enables detection of insertion of a foreign object is intermittently performed at appropriate intervals taking the effect on power supplied to the load into consideration, as stated above, power supply to the load is not adversely affected even if the load is compulsorily reduced (for example, a problem in which the charging time of the battery pack increases to a large extent does not occur).

(8) The power-transmission-side control circuit determines that a foreign object has been inserted between a primary coil and a secondary coil and stops power transmission when an intermittent change in the load of the power reception device cannot be detected. This reliably prevents heat generation from a foreign object, a skin burn, and damage to and destruction of the instrument. Therefore, highly reliable foreign object insertion measures are implemented in a non-contact power transmission system.

(9) In order to carefully determine whether or not a foreign object has been inserted, the power transmission device detects a change in the load of the power reception device in cycle units, and stops normal power transmission when the power transmission device cannot detect a change in load over a given number of cycles. This increases the foreign object insertion detection accuracy, thereby preventing a situation in which the power-transmission-side control circuit 22 erroneously stops normal power transmission when a change in load cannot be detected due to an accidental factor.

(10) Insertion of a foreign object can be accurately detected by simple signal processing without adding a special configuration. Therefore, a reliable, small, and inexpensive non-contact power transmission system can be implemented which is provided with reliable measures against insertion of a foreign object.

(11) Since it is possible to deal with insertion of a foreign object when supplying power to the load, the safety of an electronic instrument such as a portable terminal which can perform non-contact power transmission can be increased. Therefore, the user can use the electronic instrument without worry.

(12) Since it is possible to deal with insertion of a foreign object when supplying power to the load, the safety of an electronic instrument such as a charger (e.g., cradle) which can perform non-contact power transmission can be increased. Therefore, the user can use the electronic instrument without worry.

(13) Insertion of a foreign object between a primary coil and a secondary coil can be accurately detected by simple signal processing while reducing the number of parts to implement highly reliable safety measures relating to non-contact power transmission.

The invention has been described above relating to the embodiments. Note that the invention is not limited to the above embodiments. Various modifications and variations may be made. Specifically, many modifications are possible in the embodiments without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. The invention also includes any combination of the embodiments and the modifications.

The configurations and the operations of the power transmission control device, the power transmission device, the power reception control device, and the power reception device and the method of detecting the secondary-side load by the primary side are not limited to those described in the above embodiments. Various modifications and variations may be made.

Some embodiments of the invention contribute to establishing a highly reliable foreign object insertion measures relating to a non-contact power transmission system. Therefore, the invention may be utilized for a power transmission control device (power transmission control IC), a power reception control device (power reception control IC), a non-contact power transmission system, a power transmission device (e.g., IC module), a power reception device (e.g., IC module), an electronic instrument (e.g., portable terminal or charger), and the like. Note that the term "portable terminal" includes a portable telephone terminal, a PDA terminal, and a portable computer terminal.

What is claimed is:

1. A power reception control device that is provided in a power reception device that is included in a non-contact power transmission system, the non-contact power transmission system transmitting power from a power transmission device to the power reception device by electromagnetically coupling a primary coil and a secondary coil and transmitting the power to a first load electrically connected to the power reception device, the power reception control device comprising:
    a load modulation section that modulates a second load, the second load provided in the power reception device;
    a power supply control section that controls power supply to the first load; and
    a power-receiving-side control circuit that is provided in the power reception control device and controls the power reception device,
    the power-receiving-side control circuit supplying power to the first load, and controlling the load modulation section to operate and change the second load to transmit a signal which enables the power transmission device to detect a foreign object during a period from a start of normal power transmission to an end.

2. The power reception control device as defined in claim 1, the second load being changed periodically, one period is determined in a first period, the second load being changed at plural times in the first period, the plural times determined at given intervals, the given intervals determined at a second period.

3. The power reception control device as defined in claim 2, the second load being changed at plural times only at a third period in the first period, the third period being shorter than the first period.

4. The power reception control device as defined in claim 1, the power-receiving-side control circuit monitoring a load state of the first load, and compulsorily reducing the power supplied to the first load by controlling the power supply control section based on the load state of the first load.

5. The power reception control device as defined in claim 4, the power supply control section including a power supply control transistor that is provided in a power supply path connected to the first load; and
    the power-receiving-side control circuit compulsorily reducing the power supplied to the first load by successively switching the power supply control transistor.

6. The power reception control device as defined in claim 4, the power supply control section including a field effect transistor as a power supply control transistor that is provided in a power supply path connected to the first load; and
    the power-receiving-side control circuit compulsorily reducing the power supplied to the first load by reducing an output current of the field effect transistor by setting a gate voltage of the field effect transistor at an intermediate voltage between a gate voltage when the field effect transistor is completely turned ON and a gate voltage when the field effect transistor is completely turned OFF.

7. The power reception control device as defined in claim 4, the power supply control section including a series regulator that stabilizes a voltage supplied to the first load; and
    the power-receiving-side control circuit monitoring the load state of the first load by detecting a voltage between terminals of the series regulator.

8. The power reception control device as defined in claim 4, the power supply control section including a power supply control transistor that is provided in a power supply path connected to the first load; and
    the power-receiving-side control circuit monitoring the load state of the first load by detecting a voltage between terminals of the power supply control transistor.

9. The power reception control device as defined in claim 4, the power-receiving-side control circuit monitoring the load state of the first load by detecting a current that flows through a power supply path of the power supply control section.

10. A power reception device comprising:
    the power reception control device as defined in claim 1; and
    a power reception section that converts an induced voltage in the secondary coil into a direct voltage.

11. An electronic instrument comprising:
    the power reception device as defined in claim 10; and
    a load of the power reception device, power being supplied to the load from the power reception device.

12. The power reception control device as defined in claim 1, the load modulation section periodically increasing and decreasing the second load, a level of the signal that enables the power transmission device to detect the foreign object changing in response to the change of the second load.

13. The power reception control device as defined in claim 1, the load modulation section including a switching device, the power-receiving-side control circuit controlling the switching device to periodically increase and decrease the second load.

14. A power transmission control device that is provided in a power transmission device that is included in a non-contact power transmission system, the non-contact power transmission system transmitting power from the power transmission device to a power reception device by electromagnetically coupling a primary coil and a secondary coil and transmitting the power to a first load electrically connected to the power reception device, the power reception device performing load modulation to intermittently change a second load during normal power transmission, the second load provided in the power reception device, the power transmission control device comprising:
    a detection circuit that detects a change in the second load; and
    a power-transmission-side control circuit that controls the power transmission device,
    the power-transmission-side control circuit determining that a foreign object has been inserted between the primary coil and the secondary coil, and stopping the normal power transmission when a change in the second load cannot be detected during the normal power transmission.

15. The power transmission control device as defined in claim 14,
    the second load being changed periodically, one period is determined in a first period, the second load being changed at plural times in the first period, the plural times determined at given intervals, the given intervals determined at a second period, and the power-transmission-side control circuit detecting changes in the second load every first period, and the power-transmission-side control circuit stopping the normal power transmission when the power-transmission-side control circuit cannot detect a change of the second load in a given number of cycles.

16. The power transmission control device as defined in claim 14,
the detection circuit being a waveform detection circuit that detects a waveform of an induced voltage in the primary coil.

17. A power transmission device comprising:
the power transmission control device as defined in claim 14; and
a power transmission section that generates an alternating voltage and supplies the alternating voltage to the primary coil.

18. An electronic instrument comprising the power transmission device as defined in claim 17.

19. A non-contact power transmission system that transmits power from a power transmission device to a power reception device by electromagnetically coupling a primary coil and a secondary coil and transmits the power to a first load electrically connected to the power reception device, the system comprising:
the power transmission device including:
a detection circuit that detects a change of a second load, the second load provided in the power reception device; and
a power-transmission-side control circuit that controls the power transmission device;
the power reception device including:
a load modulation section that modulates the second load;
a power supply control section that controls power supply to the first load; and
a power reception control device that includes a power-receiving-side control circuit that controls the power reception device,
the power-receiving-side control circuit controlling the load modulation section to operate and change the second load when supplying power to the first load through the power supply control section during normal power transmission, the power-receiving-side control circuit reducing a load state of the first load by compulsorily reducing the power supplied to the first load by controlling the power supply control section based on the load state of the first load, and
the power-transmission-side control circuit determining that a foreign object has been inserted between the primary coil and the secondary coil, and stopping the normal power transmission when an intermittent change in the second load cannot be detected during the normal power transmission.

* * * * *